(12) United States Patent
Naniwa

(10) Patent No.: US 12,143,136 B2
(45) Date of Patent: Nov. 12, 2024

(54) RADIO-FREQUENCY MODULE AND COMMUNICATION APPARATUS

(71) Applicant: Murata Manufacturing Co., Ltd., Kyoto (JP)

(72) Inventor: Yusuke Naniwa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 323 days.

(21) Appl. No.: 17/644,650

(22) Filed: Dec. 16, 2021

(65) Prior Publication Data

US 2022/0109463 A1    Apr. 7, 2022

Related U.S. Application Data

(63) Continuation of application No. PCT/JP2020/018832, filed on May 11, 2020.

(30) Foreign Application Priority Data

Jun. 25, 2019  (JP) ................................ 2019-117603

(51) Int. Cl.
*H04B 1/04* (2006.01)
*H04B 1/16* (2006.01)
*H04B 1/18* (2006.01)

(52) U.S. Cl.
CPC ............. *H04B 1/1638* (2013.01); *H04B 1/18* (2013.01)

(58) Field of Classification Search
CPC .......... H04B 1/1638; H04B 1/18; H03H 9/46; H03H 9/48; H03H 9/58
See application file for complete search history.

(56) References Cited

U.S. PATENT DOCUMENTS 8,405,472 B2 * 3/2013 Kitamura ............... H03H 9/725
                                                              333/195
2013/0328640 A1 * 12/2013 Tsutsumi ............. H03H 9/0566
                                                              333/132

(Continued)

FOREIGN PATENT DOCUMENTS

JP    2006-135027 A    5/2006
WO    2016/189951 A1   12/2016

(Continued)

OTHER PUBLICATIONS

International Search Report issued in Application No. PCT/JP2020/018832, dated Jul. 28, 2020.

(Continued)

*Primary Examiner* — Tuan Pham
(74) *Attorney, Agent, or Firm* — Pearne & Gordon LLP

(57) ABSTRACT

To provide a radio-frequency module and a communication apparatus that are capable of suppressing degradation in filter characteristics while reducing the sizes of the radio-frequency module and the communication apparatus. A radio-frequency module (1) includes a common terminal, a first filter (21), a second filter (22), a mounting substrate (3), and an external connection terminal (8a). The first filter (21) is connected to the common terminal and transmits a first signal in a first frequency band. The second filter (22) is connected to the common terminal and transmits a second signal in a second frequency band. The mounting substrate (3) has the first filter (21) mounted thereon. The first filter (21) is connected to the mounting substrate (3) with the external connection terminal (8a). The second filter (22) is laminated on the first filter (21). The external connection terminal (8a) is the common terminal.

11 Claims, 10 Drawing Sheets

(56) References Cited

U.S. PATENT DOCUMENTS

2019/0227440 A1* 7/2019 Kamimura .............. G03F 7/038
2019/0391702 A1* 12/2019 Jo ......................... G06F 3/0421
2020/0106416 A1   4/2020 Iwamoto
2020/0228074 A1   7/2020 Naniwa et al.

FOREIGN PATENT DOCUMENTS

WO   2018/235433 A1   12/2018
WO   2019/065569 A1   4/2019

OTHER PUBLICATIONS

Written Opinion issued in Application No. PCT/JP2020/018832, dated Jul. 28, 2020.

* cited by examiner

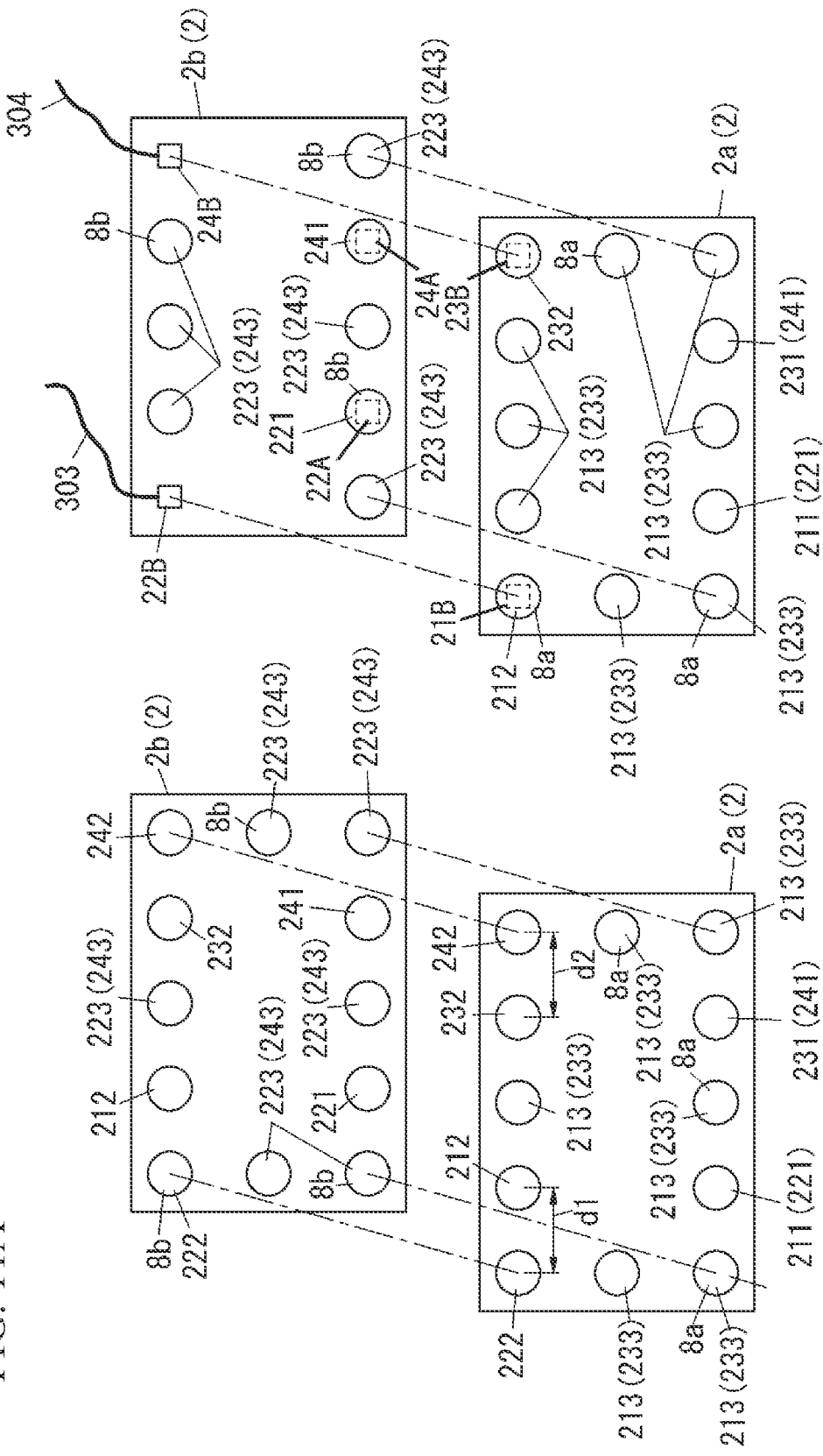

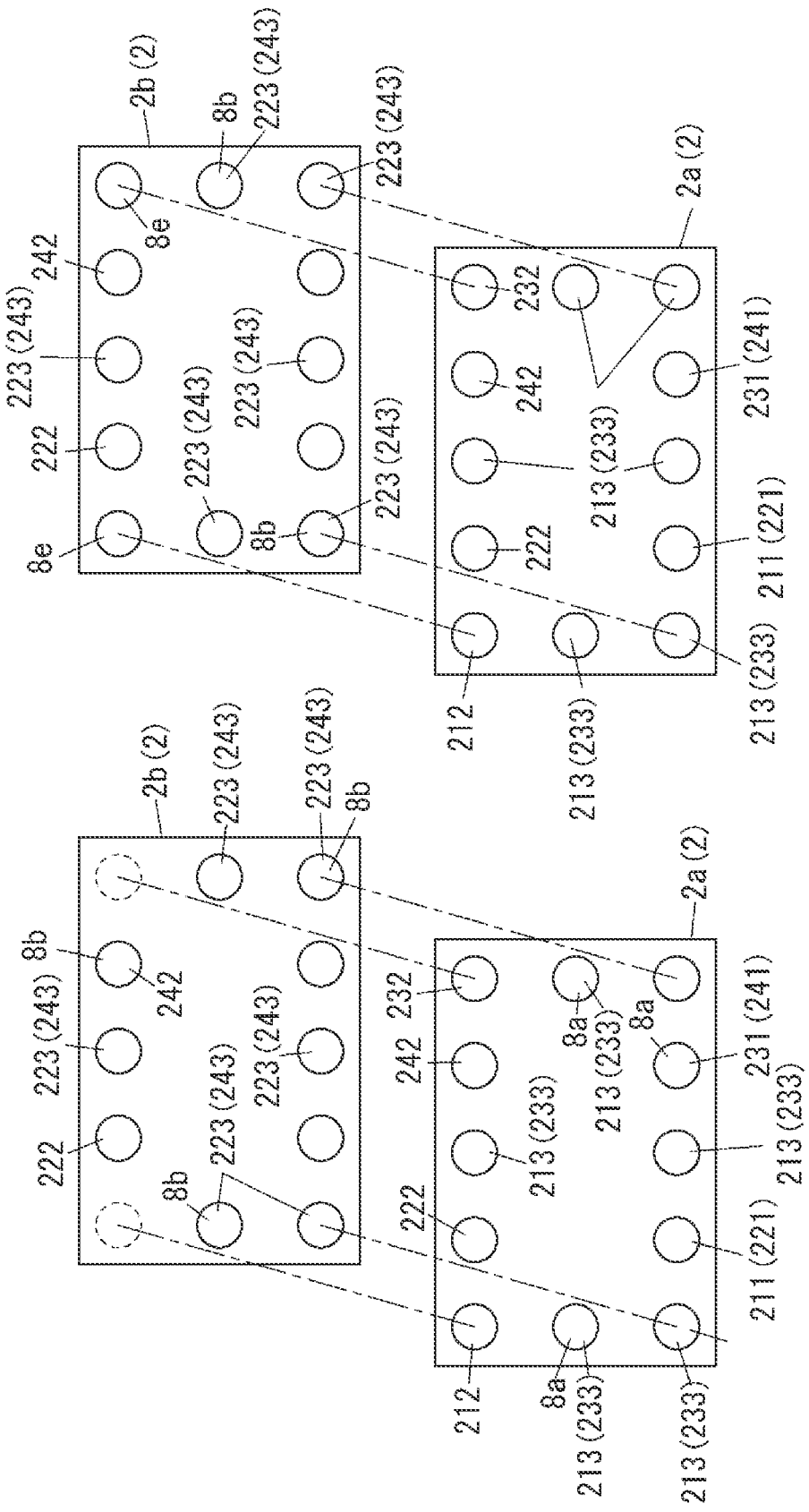

RADIO-FREQUENCY MODULE AND COMMUNICATION APPARATUS

CROSS REFERENCE TO RELATED APPLICATION

This is a continuation of International Application No. PCT/JP2020/018832 filed on May 11, 2020 which claims priority from Japanese Patent Application No. 2019-117603 filed on Jun. 25, 2019. The contents of these applications are incorporated herein by reference in their entireties.

BACKGROUND OF THE DISCLOSURE

Field of the Disclosure

The present disclosure generally relates to radio-frequency modules and communication apparatuses. More particularly, the present disclosure relates to a radio-frequency module including multiple filters and a communication apparatus including the radio-frequency module.

Description of the Related Art

Filter apparatuses have hitherto been known, which are configured so as to divide a reception signal received through one antenna into multiple frequency bands and output the signal components in the respective frequency bands (for example, refer to Patent Document 1).

The filter apparatus described in Patent Document 1 includes a first filter and a second filter. The first filter transmits a reception signal in a first frequency band among the reception signals inputted through an antenna terminal. The second filter transmits a reception signal in a second frequency band among the reception signals inputted through the antenna terminal. The first filter and the second filter are laminated in a certain direction (the thickness direction of a mounting substrate) in the filter apparatus.

Patent Document 1: International Publication No. 2018/235433

BRIEF SUMMARY OF THE DISCLOSURE

In the filter apparatus described in Patent Document 1, for example, when the second filter is laminated on the first filter, providing an input terminal of the first filter and an input terminal of the second filter on a mounting face of the first filter at the lower side decreases a ground terminal area on the mounting face of the first filter. As a result, there is a problem in that filter characteristics of the first filter are degraded.

It is an object of the present disclosure to provide a radio-frequency module and a communication apparatus, which are capable of suppressing the degradation in the filter characteristics while reducing the sizes of the radio-frequency module and the communication apparatus.

A radio-frequency module according to one aspect of the present disclosure includes a common terminal, a first filter, a second filter, a mounting substrate, and an external connection terminal. The first filter is connected to the common terminal and transmits a first signal in a first frequency band. The second filter is connected to the common terminal and transmits a second signal in a second frequency band different from the first frequency band. The mounting substrate has the first filter mounted thereon. The first filter is connected to the mounting substrate with the external connection terminal. The second filter is laminated on the first filter. The external connection terminal is the common terminal.

A communication apparatus according to one aspect of the present disclosure includes the radio-frequency module and a signal processing circuit. The signal processing circuit processes the first signal and the second signal.

According to the radio-frequency module and the communication apparatus according to the above aspects of the present disclosure, it is possible to suppress the degradation in the filter characteristics while reducing the sizes of the radio-frequency module and the communication apparatus.

BRIEF DESCRIPTION OF THE SEVERAL VIEWS OF THE DRAWINGS

FIG. 11A is a schematic plan view of the filter units in a radio-frequency module according to a comparative example, and FIG. 11B is a schematic plan view of the filter units in a radio-frequency module according to a first modification of the second embodiment.

FIG. 12A is a schematic plan view of the filter units in a radio-frequency module according to a comparative example, and FIG. 12B is a schematic plan view of the filter units in a radio-frequency module according to a second modification of the second embodiment.

DETAILED DESCRIPTION OF THE DISCLOSURE

Figure 1:
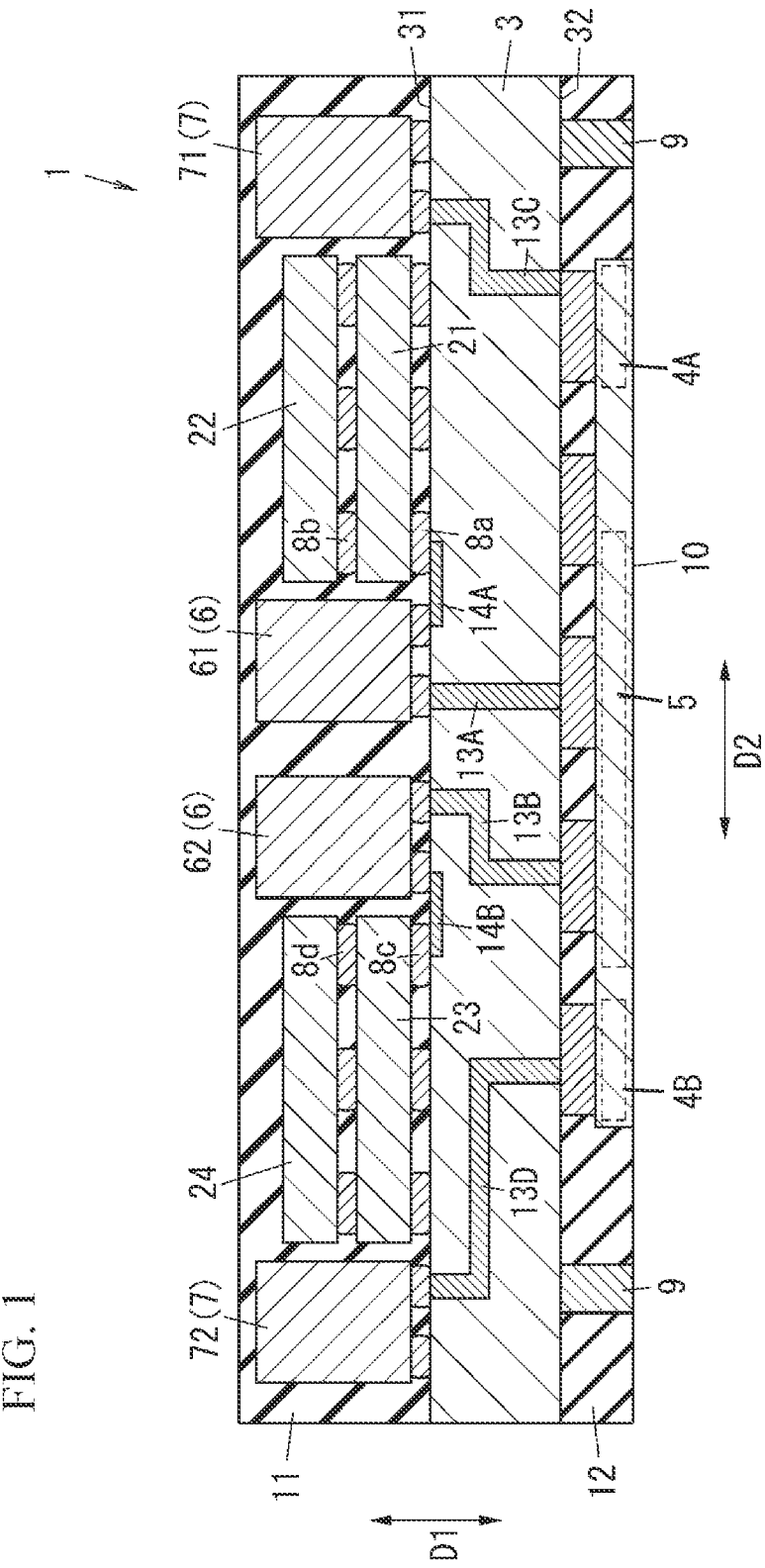
FIG. 1 is a schematic cross-sectional view of a radio-frequency module according to a first embodiment.

FIG. 1, FIG. 3A, FIG. 3B, FIG. 3C, FIG. 4, FIG. 5, FIG. 6, FIG. 7, FIG. 8A, FIG. 8B, FIG. 9, FIG. 10, FIG. 11A, FIG. 11B, FIG. 12A, and FIG. 12B, which are referred to in a first embodiment and so on, are schematic diagrams, and the ratios of the sizes and the thicknesses of the respective components in the drawings do not necessarily reflect the practical dimensional ratios.

First Embodiment

A radio-frequency module 1 and a communication apparatus 200 according to a first embodiment will herein be described with reference to FIG. 1 to FIG. 4.

(1) Entire Configuration of Radio-Frequency Module

The radio-frequency module 1 according to the present embodiment is used for, for example, the communication apparatus 200 (refer to FIG. 2) supporting multimode-multiband. Although the communication apparatus 200 is, for example, a mobile phone (for example, a smartphone), the communication apparatus 200 is not limited to this. The communication apparatus 200 may be, for example, a wearable terminal (for example, a smartwatch) or the like.

The radio-frequency module 1 is provided in, for example, the communication apparatus 200 that supports multiband and that conforms to communication standards, such as Long Term Evolution (LTE). The radio-frequency module 1 is configured so as to be capable of supporting carrier aggregation. In the present embodiment, the radio-frequency module 1 performs simultaneous communication using multiple frequency bands. Specifically, the radio-frequency module 1 receives transmission waves, which are transmitted as radio waves (carrier waves) in the multiple frequency bands.

The radio-frequency module 1 according to the present embodiment includes a common terminal, a first filter 21, a second filter 22, a mounting substrate 3, and external connection terminals 8a, as illustrated in FIG. 1. The common terminal is, for example, a first input terminal 211 electrically connected to the first filter 21. The first filter 21 is electrically connected to the common terminal and transmits a first signal in a first frequency band. The second filter 22 is electrically connected to the common terminal and transmits a second signal in a second frequency band different from the first frequency band. The mounting substrate 3 has the first filter 21 mounted thereon. The first filter 21 is electrically connected to the mounting substrate 3 with the external connection terminals 8a.

The second filter 22 is laminated on the first filter 21. The external connection terminals 8a serve as the common terminal.

Figure 2:
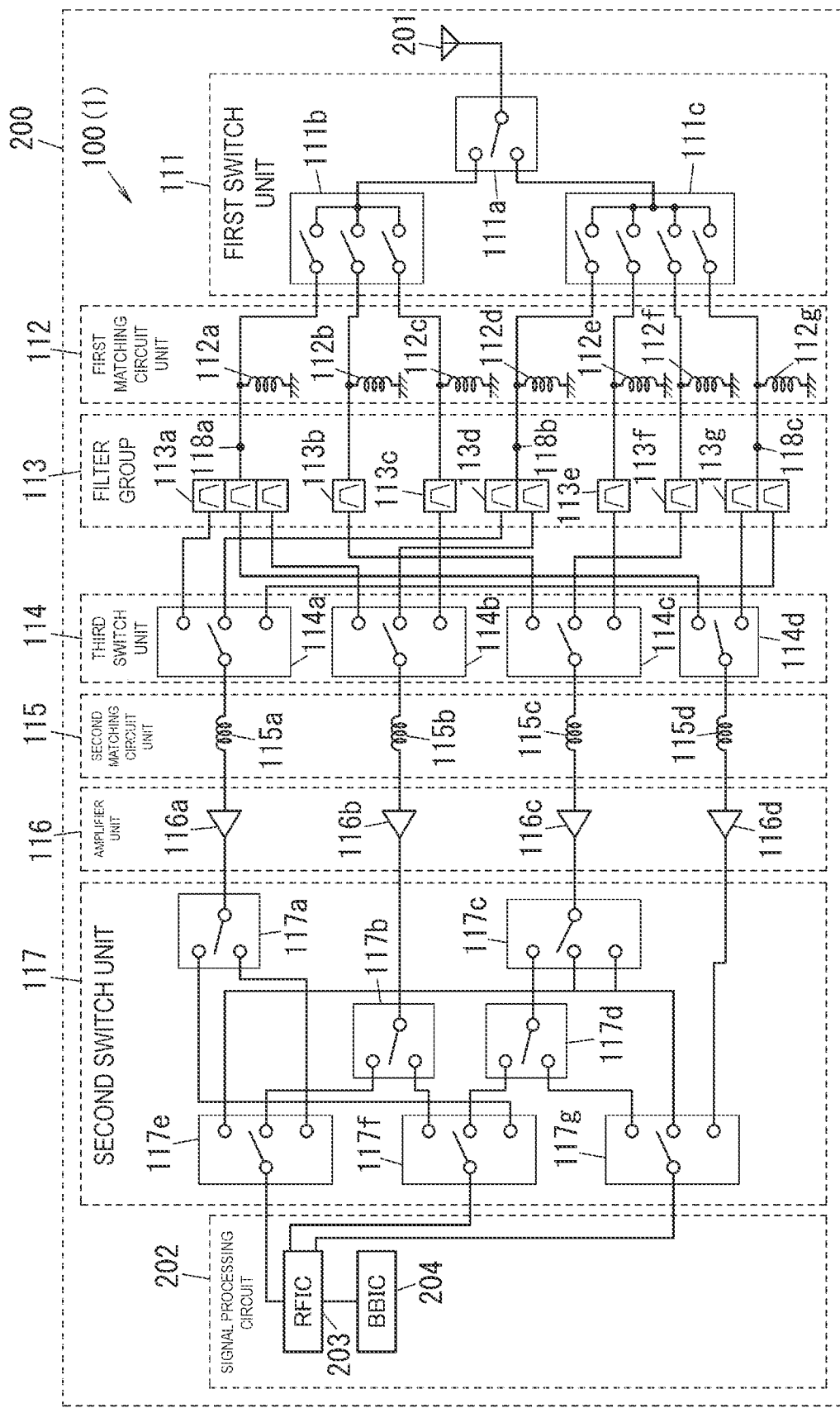
FIG. 2 is a circuit configuration diagram illustrating a front-end module serving as the radio-frequency module in FIG. 1.

The communication apparatus 200 according to the present embodiment includes the radio-frequency module 1 and a signal processing circuit 202, as illustrated in FIG. 2. The signal processing circuit 202 processes the first signal transmitted through the first filter 21 and the second signal transmitted through the second filter 22.

In the radio-frequency module 1 and the communication apparatus 200 according to the present embodiment, each of the first filter 21 and the second filter 22 is electrically connected to the common terminal (for example, the first input terminal 211). The second filter 22 is laminated on the first filter 21, and the first filter 21 is connected to the mounting substrate 3 via the external connection terminals 8a serving as the common terminal. Accordingly, a ground terminal area on a mounting face of the first filter 21 at the lower side is increased in size, compared with a case in which terminals of the first filter 21 are not integrated with terminals of the second filter 22, but are provided separately from the terminals of the second filter 22. As a result, the degradation in the filter characteristics of the first filter 21 is suppressed. In addition, since the second filter 22 is laminated on the first filter 21, the size of the mounting substrate 3 is reduced, compared with a case in which the first filter 21 and the second filter 22 are separately mounted on the mounting substrate 3. In other words, with the radio-frequency module 1 and the communication apparatus 200, it is possible to suppress the degradation in the filter characteristics of the first filter 21 while reducing the sizes of the radio-frequency module 1 and the communication apparatus 200.

(2) Components in the Radio-Frequency Module

The radio-frequency module 1 according to the present embodiment includes the mounting substrate 3, the first filter 21, the second filter 22, a third filter 23, a fourth filter 24, and a switch integrated circuit (IC) 10, as illustrated in FIG. 1. In addition, the radio-frequency module 1 includes a first matching circuit (matching circuit) 6, a second matching circuit 7, multiple external connection electrodes 9, a first resin layer 11, and a second resin layer 12.

(2.1) Mounting Substrate

The mounting substrate 3 has a first main surface 31 and a second main surface 32, as illustrated in FIG. 1. The first main surface 31 is opposed to the second main surface 32 in a first direction D1, which is the thickness direction of the mounting substrate 3. Electronic components including the first filter 21, which compose the radio-frequency module 1, are mounted on the first main surface 31 and the second main surface 32. In the present embodiment, the first filter 21, the second filter 22, the third filter 23, the fourth filter 24, the first matching circuit 6, and the second matching circuit 7 are mounted on the first main surface 31, and the switch IC 10 is mounted on the second main surface 32.

(2.2) First Filter

The first filter 21 is, for example, a radio-frequency filter. The first filter 21 transmits a reception signal (the first signal) in the first frequency band, among the reception signals received through an antenna 201 (refer to FIG. 2). The first frequency band includes, for example, a Band1 communication band. The Band1 communication band is within 2,110 MHz to 2,170 MHz. The first filter 21 is connected to the first main surface 31 of the mounting substrate 3 via the multiple external connection terminals (first external connection terminals) 8a.

The first filter 21 is, for example, an acoustic wave filter. The first filter 21 includes multiple series arm resonators and multiple parallel arm resonators. Each of the multiple series arm resonators and the multiple parallel arm resonators is composed of an acoustic wave resonator. The acoustic wave resonator is, for example, a surface acoustic wave (SAW) resonator.

The SAW resonator includes, for example, a piezoelectric substrate and interdigital transducer (IDT) electrodes provided on the piezoelectric substrate. When each of the multiple series arm resonators and the multiple parallel arm resonators is composed of the SAW resonator, the first filter 21 includes the multiple IDT electrodes that have one-to-one correspondence to the multiple series arm resonators and the multiple IDT electrodes that have one-to-one correspondence to the multiple parallel arm resonators on one piezoelectric substrate. The piezoelectric substrate is, for example, a lithium tantalate substrate, a lithium niobate substrate, or the like.

(2.3) Second Filter

The second filter 22 is, for example, a radio-frequency filter. The second filter 22 transmits a reception signal (the second signal) in the second frequency band, among the reception signals received through the antenna 201 (refer to FIG. 2). The second frequency band includes, for example, a Band3 communication band. The Band3 communication band is within 1,805 MHz to 1,880 MHz. The second filter 22 is connected to the first filter 21 via multiple external connection terminals 8b and is further connected to the first main surface 31 of the mounting substrate 3 via the first filter 21 and the external connection terminals 8a.

The second filter 22 is, for example, an acoustic wave filter. The second filter 22 includes multiple series arm resonators and multiple parallel arm resonators. Each of the multiple series arm resonators and the multiple parallel arm resonators is composed of an acoustic wave resonator. The acoustic wave resonator is, for example, a SAW resonator.

In the radio-frequency module 1, the first filter 21 and the second filter 22 are arranged in the first direction D1, which is the thickness direction of the mounting substrate 3. In other words, the first filter 21 is overlapped with the second filter 22 in a plan view from the first direction D1. Specifically, the first filter 21 and the second filter 22 are sequentially laminated from the first main surface 31 side in the first direction D1. The second filter 22 is applied to a filter 113d in a filter group 113 described below (refer to FIG. 2), along with the first filter 21.

(2.4) Third Filter

The third filter 23 is, for example, a radio-frequency filter. The third filter 23 transmits a reception signal (a third signal) in a third frequency band, among the reception signals received through the antenna 201 (refer to FIG. 2). The third frequency band includes, for example, a Band40 communication band. The Band40 communication band is within 2,300 MHz to 2,400 MHz. The third filter 23 is connected to the first main surface 31 of the mounting substrate 3 via multiple external connection terminals (second external connection terminals) 8c.

The third filter 23 is, for example, an acoustic wave filter. The third filter 23 includes multiple series arm resonators and multiple parallel arm resonators. Each of the multiple series arm resonators and the multiple parallel arm resonators is composed of an acoustic wave resonator. The acoustic wave resonator is, for example, a SAW resonator.

(2.5) Fourth Filter

The fourth filter 24 is, for example, a radio-frequency filter. The fourth filter 24 transmits a reception signal (a fourth signal) in a fourth frequency band, among the reception signals received through the antenna 201 (refer to FIG. 2). The fourth frequency band includes, for example, a Band41 communication band. The Band41 communication band is within 2,496 MHz to 2,690 MHz. The fourth filter 24 is connected to the third filter 23 via multiple external connection terminals 8d and is further connected to the first main surface 31 of the mounting substrate 3 via the third filter 23 and the multiple external connection terminals 8d.

The fourth filter 24 is, for example, an acoustic wave filter. The fourth filter 24 includes multiple series arm resonators and multiple parallel arm resonators. Each of the multiple series arm resonators and the multiple parallel arm resonators is composed of an acoustic wave resonator. The acoustic wave resonator is, for example, a SAW resonator.

In the present embodiment, the third filter 23 and the fourth filter 24 are arranged in the first direction D1, which is the thickness direction of the mounting substrate 3. In other words, the third filter 23 is overlapped with the fourth filter 24 in a plan view from the first direction D1. Specifically, the third filter 23 and the fourth filter 24 are sequentially laminated from the first main surface 31 side in the first direction D1. The fourth filter 24 is applied to a filter 113g in the filter group 113 described below (refer to FIG. 2), along with the third filter 23.

Band1, Band3, Band40, and Band41 are capable of being simultaneously used in reception of the signals through the carrier aggregation. In other words, in the radio-frequency module 1, the simultaneous communication is available with the first filter 21, the second filter 22, the third filter 23, and the fourth filter 24.

(2.6) Switch IC

The switch IC 10 is an integrated circuit including multiple low noise amplifiers 4A and 4B and an antenna switch 5, as illustrated in FIG. 1.

Each of the multiple low noise amplifiers 4A and 4B has an input terminal and an output terminal. For example, the low noise amplifier 4A amplifies the reception signal in a certain frequency band, which passes through the second filter 22 and is inputted through the input terminal, and outputs the amplified reception signal from the output terminal. In other words, the low noise amplifier 4A amplifies and outputs the reception signal passing through the second filter 22. For example, the low noise amplifier 4B amplifies the reception signal in a certain frequency band, which passes through the third filter 23 and is inputted through the input terminal, and outputs the amplified reception signal from the output terminal. In other words, the low noise amplifier 4B amplifies and outputs the reception signal passing through the third filter 23. The low noise amplifier 4A is applied to, for example, an amplifier circuit 116b in an amplifier unit 116 described below (refer to FIG. 2). The low noise amplifier 4B is applied to, for example, an amplifier circuit 116d in the amplifier unit 116 (refer to FIG. 2).

The antenna switch 5 is, for example, a single pole single throw (SPST) switch. The antenna switch 5 is connected between the antenna 201 (refer to FIG. 2) and the filter group 113 (refer to FIG. 2) and switches between a conduction state in which the antenna 201 is connected to the filter group 113 and a non-connection state in which the antenna 201 is disconnected from the filter group 113. The antenna switch 5 is applied to a first switch unit 111 described below (refer to FIG. 2).

In the radio-frequency module 1, the switch IC 10 including the low noise amplifiers 4A and 4B and the antenna switch 5 is mounted on the second main surface 32 of the mounting substrate 3, as illustrated in FIG. 1. The switch IC 10 is overlapped with the first filter 21 and the second filter 22 in a plan view from the first direction D1, which is the thickness direction of the mounting substrate 3. More specifically, the antenna switch 5 included in the switch IC 10 is overlapped with part of the first filter 21 and the second filter 22 in a plan view from the first direction D1.

In addition, in the radio-frequency module 1, the switch IC 10 is overlapped with part of the third filter 23 and the fourth filter 24 in a plan view from the first direction D1. More specifically, the antenna switch 5 included in the switch IC 10 is overlapped with part of the third filter 23 and the fourth filter 24 in a plan view from the first direction D1.

(2.7) First Matching Circuit

The first matching circuit 6 includes multiple inductors 61 and 62. The inductor 61 is mounted on the first main surface 31 of the mounting substrate 3 in a state in which the inductor 61 is adjacent to the first filter 21 and the second filter 22. The inductor 62 is mounted on the first main surface 31 of the mounting substrate 3 in a state in which the inductor 62 is adjacent to the third filter 23 and the fourth filter 24. In this description and so on, "being adjacent" means that another electronic component does not exist between two adjacent electronic components. In FIG. 1, another electronic component does not exist between the first filter 21 and the second filter 22 and the inductor 61 (the first matching circuit 6). In addition, in FIG. 1, another electronic component does not exist between the third filter 23 and the fourth filter 24 and the inductor 62 (the first matching circuit 6).

The inductor 61 is connected to the antenna switch 5 in the switch IC 10 via a via 13A. The inductor 61 is connected to the first filter 21 and the second filter 22 via a conductor 14A. In other words, the inductor 61 in the first matching circuit 6 is connected between the first filter 21 and the second filter 22 and the antenna switch 5. The inductor 62 is connected to the antenna switch 5 in the switch IC 10 via a via 13B. The inductor 62 is connected to the third filter 23 and the fourth filter 24 via a conductor 14B. In other words, the inductor 62 in the first matching circuit 6 is connected between the third filter 23 and the fourth filter 24 and the antenna switch 5. The first matching circuit 6 is applied to, for example, a first matching circuit unit 112 described below (refer to FIG. 2).

In the radio-frequency module 1, the switch IC 10 is overlapped with the first matching circuit 6 (the inductors 61 and 62) in a plan view from the first direction D1, which is the thickness direction of the mounting substrate 3. More specifically, the antenna switch 5 included in the switch IC 10 is overlapped with the first matching circuit 6 in a plan view from the first direction D1. Accordingly, it is possible to shorten the path (wiring length) between the antenna switch 5 and the first matching circuit 6.

In addition, in the radio-frequency module 1, the antenna switch 5 is overlapped with part of the first filter 21 and the second filter 22 in a plan view from the first direction D1, as described above. Accordingly, it is possible to shorten the conductor 14A with which the first matching circuit 6 (the inductor 61) is connected to the first filter 21 and the second filter 22, compared with a case in which the antenna switch 5 is not overlapped with the first filter 21 and the second filter 22. As a result, it is possible to shorten the path (wiring length) from the antenna switch 5 to the first filter 21 and the second filter 22.

Furthermore, in the radio-frequency module 1, the first matching circuit 6 (the inductor 61) is adjacent to the first filter 21 and the second filter 22. Accordingly, it is possible to further shorten the conductor 14A with which the first matching circuit 6 is connected to the first filter 21 and the second filter 22. As a result, it is possible to further shorten the path (wiring length) from the antenna switch 5 to the first filter 21 and the second filter 22.

(2.8) Second Matching Circuit

The second matching circuit 7 includes multiple inductors 71 and 72. The inductor 71 is mounted on the first main surface 31 of the mounting substrate 3 in a state in which the inductor 71 is adjacent to the first filter 21 and the second filter 22. In other words, another electronic component does not exist between the first filter 21 and the second filter 22 and the inductor 71 (the second matching circuit 7). The inductor 72 is mounted on the first main surface 31 of the mounting substrate 3 in a state in which the inductor 72 is adjacent to the third filter 23 and the fourth filter 24. In other words, another electronic component does not exist between the third filter 23 and the fourth filter 24 and the inductor 72 (the second matching circuit 7).

The inductor 71 is connected to the low noise amplifier 4A in the switch IC 10 via a via 13C. The inductor 72 is connected to the low noise amplifier 4B in the switch IC 10 via a via 13D. The second matching circuit 7 is applied to, for example, a second matching circuit unit 115 described below (refer to FIG. 2).

(2.9) External Connection Electrodes

The multiple external connection electrodes 9 are provided on the second main surface 32 of the mounting substrate 3. The multiple external connection electrodes 9 connect the radio-frequency module 1 to a mother board on which the signal processing circuit 202 described below (refer to FIG. 2) and so on are mounted. The multiple external connection electrodes 9 are, for example, columnar (for example, cylindrical) electrodes. The material of the multiple external connection electrodes 9 is, for example, metal (for example, copper, copper alloy, or the like).

(2.10) Resin Layers

The electronic components, such as the first filter 21, mounted on the first main surface 31 of the mounting substrate 3, are covered with the first resin layer 11 at the first main surface 31 side of the mounting substrate 3. The electronic components, such as the switch IC 10, mounted on the second main surface 32 of the mounting substrate 3, are covered with the second resin layer 12 at the second main surface 32 side of the mounting substrate 3. The material of the first resin layer 11 may be the same as that of the second resin layer 12 or may be different from that of the second resin layer 12.

(3) Terminal Arrangement in Each Filter

Figure 3A:
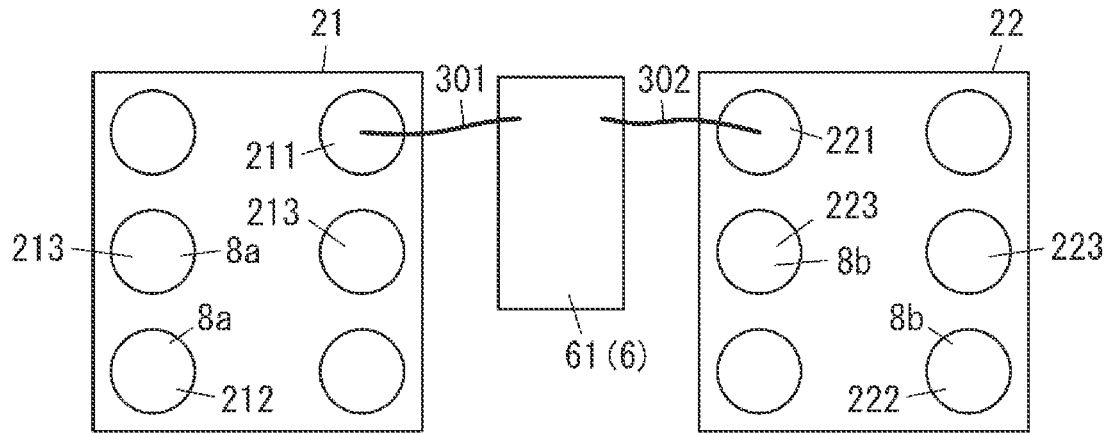
FIG. 3A is a schematic diagram illustrating the connection between filters and an inductor in a radio-frequency module according to a comparative example.
Figure 3B:
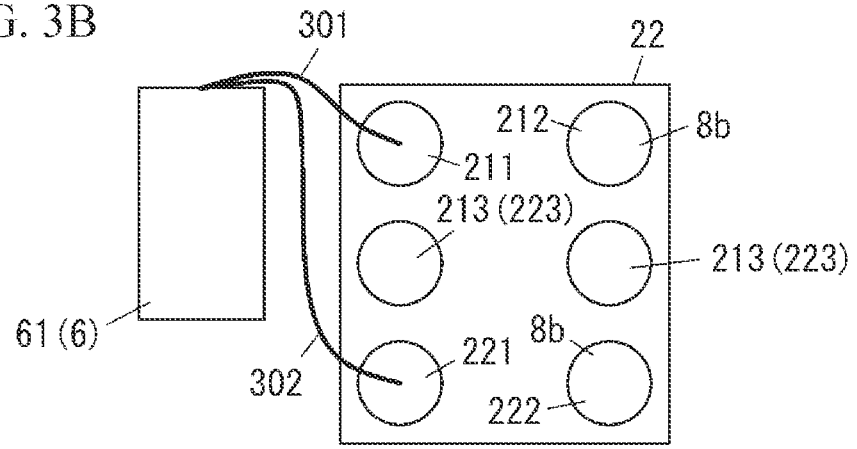
FIG. 3B is a schematic diagram illustrating the connection between the filters and the inductor in a radio-frequency module according to another comparative example.
Figure 3C:
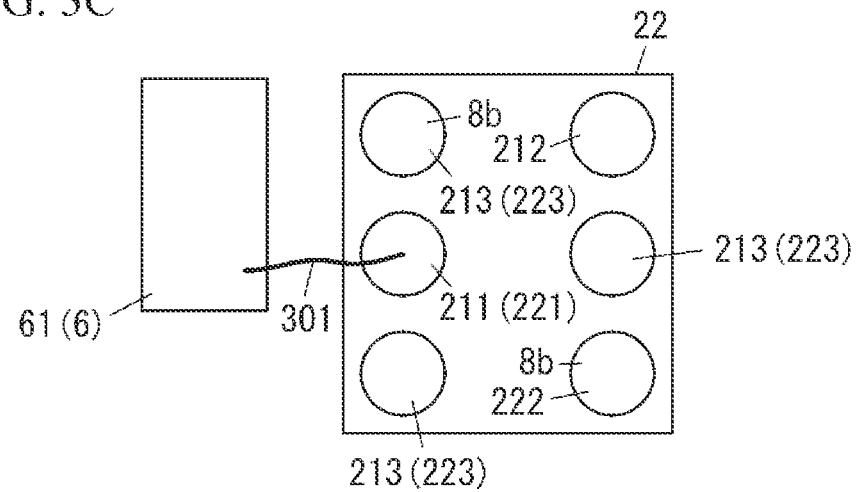
FIG. 3C is a schematic diagram illustrating the connection between the filters and the inductor in the radio-frequency module according to the first embodiment.

Terminal arrangement in the first filter 21 and the second filter 22 will now be described with reference to FIG. 3A to FIG. 3C. FIG. 3A and FIG. 3B are schematic diagrams illustrating the terminal arrangement in the first filter 21 and the second filter 22 in comparative examples. FIG. 3C is a schematic diagram illustrating the terminal arrangement in the first filter 21 and the second filter 22 according to the present embodiment.

In FIG. 3A, the first filter 21 and the second filter 22 are respectively mounted on the mounting substrate 3. The first input terminal 211, a first output terminal 212, and multiple ground terminals 213 are electrically connected to the first filter 21. The first filter 21 is connected to the first main surface 31 of the first main surface 31 via the first input terminal 211, the first output terminal 212, and the multiple ground terminals 213. The first input terminal 211, the first output terminal 212, and the multiple ground terminals 213 are, for example, the external connection terminals (first external connection terminals) 8a. A second input terminal 221, a second output terminal 222, and multiple ground terminals 223 are electrically connected to the second filter 22. The second filter 22 is connected to the first main surface 31 of the mounting substrate 3 via the second input terminal 221, the second output terminal 222, and the multiple ground terminals 223. The second input terminal 221, the second output terminal 222, and the multiple ground terminals 223 are, for example, the external connection terminals 8b. Although the external connection terminals 8a and 8b are, for example, solder bumps, the external connection terminals 8a and 8b may be metal bumps. In FIG. 3A, the first input terminal 211 of the first filter 21 is connected to the inductor 61 in the first matching circuit 6 with a bonding wire 301, and the second input terminal 221 of the second filter 22 is connected to the inductor 61 in the first matching circuit 6 with a bonding wire 302.

In FIG. 3B, the first filter 21 and the second filter 22 are mounted on the first main surface 31 of the mounting substrate 3 in a state in which the first filter 21 and the second filter 22 are sequentially laminated from the first main surface 31 side in the first direction D1, which is the thickness direction of the mounting substrate 3. In other words, the first filter 21 is overlapped with the second filter 22 in a plan view from the first direction D1 in FIG. 3B. The first input terminal 211 electrically connected to the first filter 21 is provided separately from the second input terminal 221 electrically connected to the second filter 22 in FIG. 3B. The first input terminal 211 is connected to the mounting substrate 3. The second input terminal 221 is connected to the mounting substrate 3 via the external connection terminal 8a composing the first input terminal 211, among the multiple external connection terminals 8a. In FIG. 3B, the first input terminal 211 of the first filter 21 is connected to the inductor 61 in the first matching circuit 6 with the bonding wire 301, and the second input terminal 221 of the second filter 22 is connected to the inductor 61 in the first matching circuit 6 with the bonding wire 302.

As described above, since the first input terminal 211 of the first filter 21 is provided separately from the second input terminal 221 of the second filter 22 in FIG. 3A and FIG. 3B, it is necessary to use the two bonding wires 301 and 302 for the connection to the inductor 61 in the first matching circuit 6.

In contrast, in the radio-frequency module 1, the first filter 21 and the second filter 22 are mounted on the first main surface 31 of the mounting substrate 3 in the state in which the first filter 21 and the second filter 22 are sequentially laminated from the first main surface 31 side in the first direction D1, as illustrated in FIG. 3C. In other words, the first filter 21 is overlapped with the second filter 22 in a plan view from the first direction D1. In addition, in the radio-frequency module 1, the first input terminal 211 of the first filter 21 is electrically connected to the second input terminal 221 of the second filter 22 to be integrated with the second input terminal 221 of the second filter 22. In other words, the first input terminal 211 electrically connected to the first filter 21 is the common terminal in the radio-frequency module 1. Accordingly, since it is sufficient to provide one bonding wire 301 with which the inductor 61 in the first matching circuit 6 is connected to the first input terminal 211 of the first filter 21 and the second input terminal 221 of the second filter 22 in the radio-frequency module 1, the number of the wires is decreased, compared with the cases in FIG. 3A and FIG. 3B. In other words, putting together the first input terminal 211 and the second input terminal 221 in the first filter 21 and the second filter 22 enables the degree of freedom of the arrangement of the filters to be improved.

In addition, in the radio-frequency module 1, the first filter 21 and the second filter 22 are laminated in the first direction D1, which is the thickness direction of the mounting substrate 3. Accordingly, the size of the mounting substrate 3 is reduced, compared with the case in which the first filter 21 and the second filter 22 are separately mounted on the mounting substrate 3. As a result, it is also possible to reduce the size of the radio-frequency module 1 including the mounting substrate 3.

Furthermore, in the radio-frequency module 1, the first filter 21 and the second filter 22 are electrically connected to the common terminal (the first input terminal 211 here), and the first filter 21 and the second filter 22 are mounted on the mounting substrate 3 via the common terminal. In the radio-frequency module 1, the second filter 22 is laminated on the first filter 21. Accordingly, the ground terminal area on the mounting face of the first filter 21 at the lower side is increased in size, compared with the case in which the terminals of the first filter 21 are not integrated with the terminals of the second filter 22, but are provided separately from the terminals of the second filter 22. As a result, the degradation in the filter characteristics of the first filter 21 is suppressed. In addition, since the second filter 22 is laminated on the first filter 21, the size of the mounting substrate 3 is reduced, compared with the case in which the first filter 21 and the second filter 22 are separately mounted on the mounting substrate 3. In other words, with the radio-frequency module 1, it is possible to suppress the degradation in the filter characteristics of the first filter 21 while reducing the size of the radio-frequency module 1.

The first filter 21 is connected to the antenna switch 5 via the first input terminal 211. The second filter 22 is connected to the antenna switch 5 via the second input terminal 221. In the radio-frequency module 1, the first input terminal (common terminal) 211 is connected to the mounting substrate 3, and the second input terminal 221 is connected to the mounting substrate 3 via the first input terminal 211. Accordingly, it is possible to shorten the path (wiring length) between the first filter 21 and the second filter 22 and the antenna switch 5.

The radio-frequency module 1 is configured so that the simultaneous communication is performed with the first filter 21, the second filter 22, the third filter 23, and the fourth filter 24, as described above. In this case, the first signal transmitted through the first filter 21, the second signal transmitted through the second filter 22, the third signal transmitted through the third filter 23, and the fourth signal transmitted through the fourth filter 24 are bound with each other at an input end (hereinafter also referred to as a "binding point") of the antenna switch 5. For example, the phase of the third frequency band of the third filter 23 with respect to the first frequency band of the first filter 21 and the second frequency band of the second filter 22 at the binding point is clockwise phase due to the wiring length from the antenna switch 5 to the first filter 21 and the second filter 22 and is counterclockwise phase due to the inductance of the first matching circuit 6 and the parasitic capacitance of the antenna switch 5. Accordingly, shortening the wiring length from the antenna switch 5 to the first filter 21 and the second filter 22 has the advantage of improving the characteristics of the third frequency band when the first frequency band, the second frequency band, and the third frequency band are bound with each other.

(4) Application Examples

The radio-frequency module 1 according to the present embodiment is applicable as a front-end module 100 illustrated in FIG. 2.

The front-end module 100 serving as the radio-frequency module 1 is provided in the communication apparatus 200. The communication apparatus 200 includes the front-end module 100, the signal processing circuit 202, and the antenna 201, as illustrated in FIG. 2. The communication apparatus 200 transmits and receives signals via the antenna 201. Only the reception-side circuit is illustrated in FIG. 2 and the transmission-side circuit is omitted in FIG. 2.

(4.1) Front-End Module

The circuit configuration of the front-end module 100 will now be described with reference to FIG. 2.

The front-end module 100 is arranged in, for example, a front-end unit of a mobile phone supporting multimode-multiband. The front-end module 100 is incorporated in, for example, a multiband mobile phone conforming to communication standards, such as LTE. The front-end module 100 has multiple paths (signal paths) through which multiple radio-frequency signals having different frequency bands are transmitted.

The front-end module 100 includes the first switch unit 111, the first matching circuit unit 112, the filter group 113, a third switch unit 114, the second matching circuit unit 115, the amplifier unit 116, and a second switch unit 117, as illustrated in FIG. 2. The first switch unit 111, the second switch unit 117, the third switch unit 114, and the amplifier unit 116 are included in the switch IC 10 (refer to FIG. 1). In other words, the first switch unit 111, the second switch unit 117, the third switch unit 114, and the amplifier unit 116 are formed into one chip to compose the switch IC 10.

The multiple signal paths are the paths through the switch IC 10, the filter group 113, the first matching circuit unit 112, and the second matching circuit unit 115, which the signal passes through. The signal passes through any of the multiple signal paths in the order of the first switch unit 111, the first matching circuit unit 112, the filter group 113, the third switch unit 114, the second matching circuit unit 115, the amplifier unit 116, and the second switch unit 117.

(4.1.1) First Switch Unit

The first switch unit 111 includes, for example, switches 111a to 111c. The switches 111a to 111c are, for example, field effect transistor (FET) switches made of GaAs or complementary metal oxide semiconductor (CMOS) or diode switches. The input terminal of the first switch unit 111 is connected to the antenna 201. The output terminals of the first switch unit 111 are connected to the input terminals of the filter group 113. The first switch unit 111 allocates the signal received through the antenna 201 to the signal paths for the respective filters 113a to 113g composing the filter group 113. The connection state of each of the switches 111a to 111c is switched in accordance with, for example, a control signal supplied from an RF signal processing circuit 203 described below. In the present embodiment, the first switch unit 111 is composed of the antenna switch 5 (refer to FIG. 1).

(4.1.2) First Matching Circuit Unit

The first matching circuit unit 112 includes, for example, inductors 112a to 112g. Each of the inductors 112a to 112g is a circuit element for the impedance matching between the first switch unit 111 and the filter group 113. One ends of the respective inductors 112a to 112g are connected to the paths with which the switches 111a to 111c in the first switch unit 111 are connected to the filters 113a to 113g in the filter group 113, and the other ends of the respective inductors 112a to 112g are connected to reference terminal (ground). The respective inductors 112a to 112g may be connected in series to the above paths. The first matching circuit unit 112 does not limitedly include the inductors 112a to 112g, and the first matching circuit unit 112 may include capacitors or may be circuits resulting from the combination of inductors and capacitors. In the present embodiment, the inductor 112d in the first matching circuit unit 112 is composed of the inductor 61 in the first matching circuit 6, and the inductor 112g in the first matching circuit unit 112 is composed of the inductor 62 in the first matching circuit 6.

(4.1.3) Filter Group

The filter group 113 includes the filters 113a to 113g each composed of a surface acoustic wave resonator, a bulk acoustic wave (BAW) resonator, a film bulk acoustic resonator (FBAR), or the like. The filters 113a to 113g may each be composed of an LC resonant circuit or the like. In the present embodiment, the filters 113a to 113g are each composed of the surface acoustic wave resonator. The output terminals of the filter group 113 are connected to the input terminals of the third switch unit 114.

The filter 113a is, for example, a triplexer in which the input terminals of three filters are integrated with each other. Each of the filter 113d and the filter 113g is, for example, a duplexer in which the input terminals of two filters are integrated with each other. In the filter 113a, the input terminals of the three filters are put together with a common terminal 118a. In the filter 113d, the input terminals of the two filters are put together with a common terminal 118b. In the filter 113g, the input terminals of the two filters are put together with a common terminal 118c.

In the present embodiment, the two filters composing the filter 113d are composed of the first filter 21 and the second filter 22, and the two filters composing the filter 113g are composed of the third filter 23 and the fourth filter 24. In other words, in the present embodiment, the common terminal 118b is the common terminal for the first filter 21 and the second filter 22, and the common terminal 118c is the common terminal for the third filter 23 and the fourth filter 24.

(4.1.4) Third Switch Unit

The third switch unit 114 includes switches 114a to 114d. The switches 114a to 114c are, for example, FET switches made of GaAs or CMOS or diode switches. The output terminals of the respective switches 114a to 114d are connected to the input terminals of the second matching circuit unit 115. Specifically, the input terminals of the respective switches 114a to 114d are connected to the filter group 113, and the output terminals of the respective switches 114a to 114d are connected to inductors 115a to 115d in the second matching circuit unit 115. Each of the switches 114a to 114d selects a signal passing through the filters 113a to 113g and supplies the selected signal to the second matching circuit unit 115. The connection state of each of the switches 114a to 114c is switched in accordance with, for example, the control signal supplied from the RF signal processing circuit 203.

(4.1.5) Second Matching Circuit Unit

The second matching circuit unit 115 includes the inductors 115a to 115d. Each of the inductors 115a to 115d is a circuit element for the impedance matching between the third switch unit 114 and the amplifier unit 116. One end of each of the inductors 115a to 115d is connected to the corresponding switch, among the switches 114a to 114d, and the other end of each of the inductors 115a to 115d is connected to the corresponding amplifier circuit, among amplifier circuits 116a to 116d. The respective inductors 115a to 115d may be connected between the paths with which the third switch unit 114 is connected to the amplifier unit 116 and the ground. The second matching circuit unit 115 does not limitedly include the inductors 115a to 115g, and the second matching circuit unit 115 may include capacitors or may be circuits resulting from the combination of inductors and capacitors. In the present embodiment, the inductor 115b in the second matching circuit unit 115 is composed of the inductor 71 in the second matching circuit 7, and the inductor 115d in the second matching circuit unit 115 is composed of the inductor 72 in the second matching circuit 7.

(4.1.6) Amplifier Unit

The amplifier unit 116 includes the amplifier circuits 116a to 116d. Each of the amplifier circuits 116a to 116d amplifies the reception signal passing through the first switch unit 111, the first matching circuit unit 112, the filter group 113, the third switch unit 114, and the second matching circuit unit 115. Each of the amplifier circuits 116a to 116d is, for example, a low noise amplifier. The input terminal of each of the amplifier circuits 116a to 116d is connected to the corresponding inductor, among the inductors 115a to 115d. The output terminal of each of the amplifier circuits 116a to 116*d* is connected to the second switch unit 117. In the present embodiment, the amplifier circuit 116*b* is composed of the low noise amplifier 4A, and the amplifier circuit 116*d* is composed of the low noise amplifier 4B.

(4.1.7) Second Switch Unit

The second switch unit 117 includes, for example, switches 117*a* to 117*g*. The switches 117*a* to 117*c* are, for example, FET switches made of GaAs or CMOS or diode switches. The second switch unit 117 is connected to the RF signal processing circuit 203 in the signal processing circuit 202. The second switch unit 117 allocates the reception signal amplified in the amplifier unit 116 to a certain terminal of the RF signal processing circuit 203. The connection state of each of the switches 117*a* to 117*c* is switched in accordance with, for example, the control signal supplied from the RF signal processing circuit 203.

(4.2) Signal Processing Circuit

The signal processing circuit 202 includes, for example, the RF signal processing circuit 203 and a baseband signal processing circuit 204. The RF signal processing circuit 203 is, for example, a radio frequency integrated circuit (RFIC) and performs signal processing to the radio-frequency signal. The baseband signal processing circuit 204 is, for example, a baseband integrated circuit (BBIC) and performs certain signal processing to a transmission signal supplied from the outside of the signal processing circuit 202. The reception signal processed in the baseband signal processing circuit 204 is used, for example, for image display as an image signal or for calling as an audio signal. The front-end module 100 transmits the radio-frequency signal (the reception signal here) between the antenna 201 and the RF signal processing circuit 203 in the signal processing circuit 202. In the communication apparatus 200, the baseband signal processing circuit 204 is not an essential component.

(4.3) Structure of Front-End Module

The structure of the front-end module 100 will now be described with reference to FIG. 4.

The front-end module 100 includes a mounting substrate 120 corresponding to the mounting substrate 3 described above. The mounting substrate 120 (3) has a first main surface 121 (31) and a second main surface 122 (32). The first main surface 121 is opposed to the second main surface 122 in the first direction D1, which is the thickness direction of the mounting substrate 120. The first matching circuit unit 112, the filter group 113, and the second matching circuit unit 115 are provided on the first main surface 121. A switch IC 110 is provided on the second main surface 122. The first matching circuit unit 112, the filter group 113, and the second matching circuit unit 115 are covered with first resin 161 at the first main surface 121 side. The switch IC 110 is covered with second resin 162 at the second main surface 122 side. The first resin 161 corresponds to the first resin layer 11 described above, and the second resin 162 corresponds to the second resin layer 12 described above.

The front-end module 100 further includes multiple electrodes 150. The multiple electrodes 150 are provided on the second main surface 122. The multiple electrodes 150 are arranged around the switch IC 110 on the second main surface 122. The first switch unit 111 of the switch IC 110 receives the radio-frequency signal through the multiple electrodes 150. The multiple electrodes 150 may be copper pillars (copper pins), may be electrodes made of plating, copper paste, or the like, or may be solder or the like. The multiple electrodes 150 correspond to the multiple external connection electrodes 9 described above.

In the front-end module 100, the filter 113*d*, which is a duplexer, is composed of the first filter 21 and the second filter 22. The filter 113*g*, which is a duplexer, is composed of the third filter 23 and the fourth filter 24.

Also, in the front-end module 100, the first switch unit 111 is overlapped with part of the filter 113*d* (the first filter 21 and the second filter 22) when the mounting substrate 120 is viewed from the first direction D1, that is, in a plan view of the mounting substrate 120.

In the front-end module 100, the first filter 21, the second filter 22, and the inductor 112*d* are arranged so that the first filter 21 and the second filter 22 are adjacent to the inductor 112*d* in a second direction D2. In the front-end module 100, the third filter 23, the fourth filter 24, and the inductor 112*g* are arranged so that the third filter 23 and the fourth filter 24 are adjacent to the inductor 112*g* in the second direction D2.

For example, an output terminal 101 of the first switch unit 111 is connected to the inductor 112*d* via a via 102. The inductor 112*d* is connected to the first filter 21 and the second filter 22 via a conductor 103. With this configuration, the first switch unit 111 is connected to the first filter 21 and the second filter 22 via the via 102 and the inductor 112*d*.

(5) Modifications

Modifications of the radio-frequency module 1 (the front-end module 100) according to the first embodiment will now be described.

(5.1) First Modification

Figure 4:
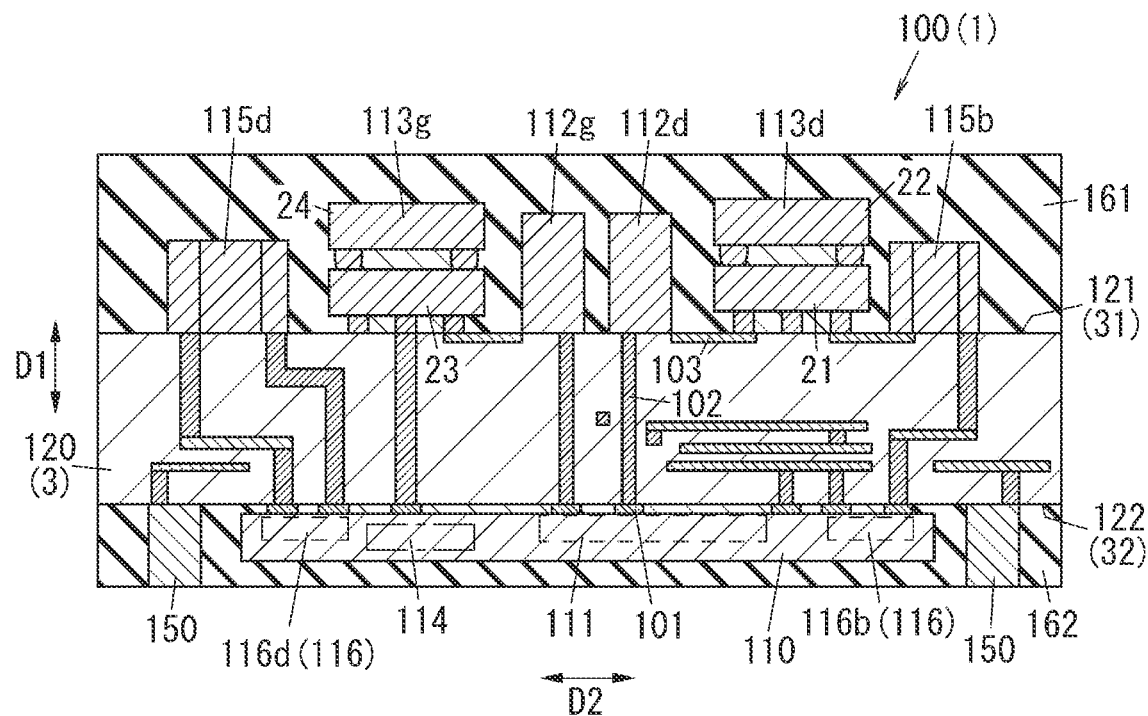
FIG. 4 is a cross-sectional view of the front-end module in FIG. 2.

In the first embodiment, the first switch unit 111, the second switch unit 117, the third switch unit 114, and the amplifier unit 116 are formed into one chip to compose the switch IC 10 in the front-end module 100 serving as the radio-frequency module 1, as illustrated in FIG. 4. In contrast, the first switch unit 111, the second switch unit 117, the third switch unit 114, and the amplifier unit 116 may be separately provided, as illustrated in FIG. 5.

Figure 5:
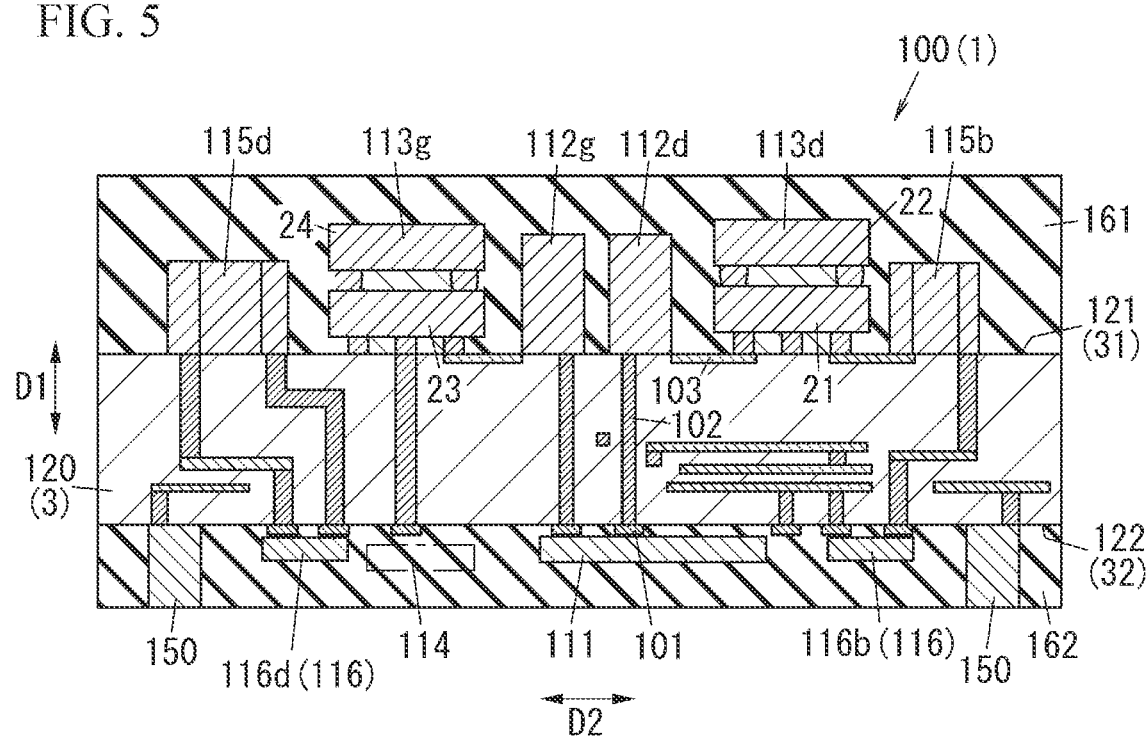
FIG. 5 is a cross-sectional view of the front-end module serving as the radio-frequency module according to a first modification of the first embodiment.

In the front-end module 100 according to a first modification, the first switch unit 111 is overlapped with part of the first filter 21 and the second filter 22 in a plan view from the first direction D1, which is the thickness direction of the mounting substrate 3, as illustrated in FIG. 5. The first switch unit 111 is overlapped with part of the first matching circuit unit 112 in a plan view from the first direction D1. Accordingly, it is possible to shorten the path (wiring length) from the first switch unit 111 to the first filter 21 and the second filter 22.

In addition, in the front-end module 100 according to the first modification, the first matching circuit unit 112 is adjacent to the first filter 21 and the second filter 22 in the second direction D2, which is the direction orthogonal to the first direction D1, which is the thickness direction of the mounting substrate 120. Accordingly, it is possible to further shorten the path (wiring length) from the first switch unit 111 to the first filter 21 and the second filter 22.

(5.2) Second Modification

A radio-frequency module 1A according to a second modification will now be described with reference to FIG. 6.

In the radio-frequency module 1 according to the first embodiment, the second resin layer 12 is provided so as to cover the switch IC 10 mounted on the second main surface 32 at the second main surface 32 side of the mounting substrate 3, as illustrated in FIG. 1. The radio-frequency module 1 includes the multiple external connection electrodes 9 each formed into a cylindrical shape and is connected to the mother board with the multiple external connection electrodes 9.

Figure 6:
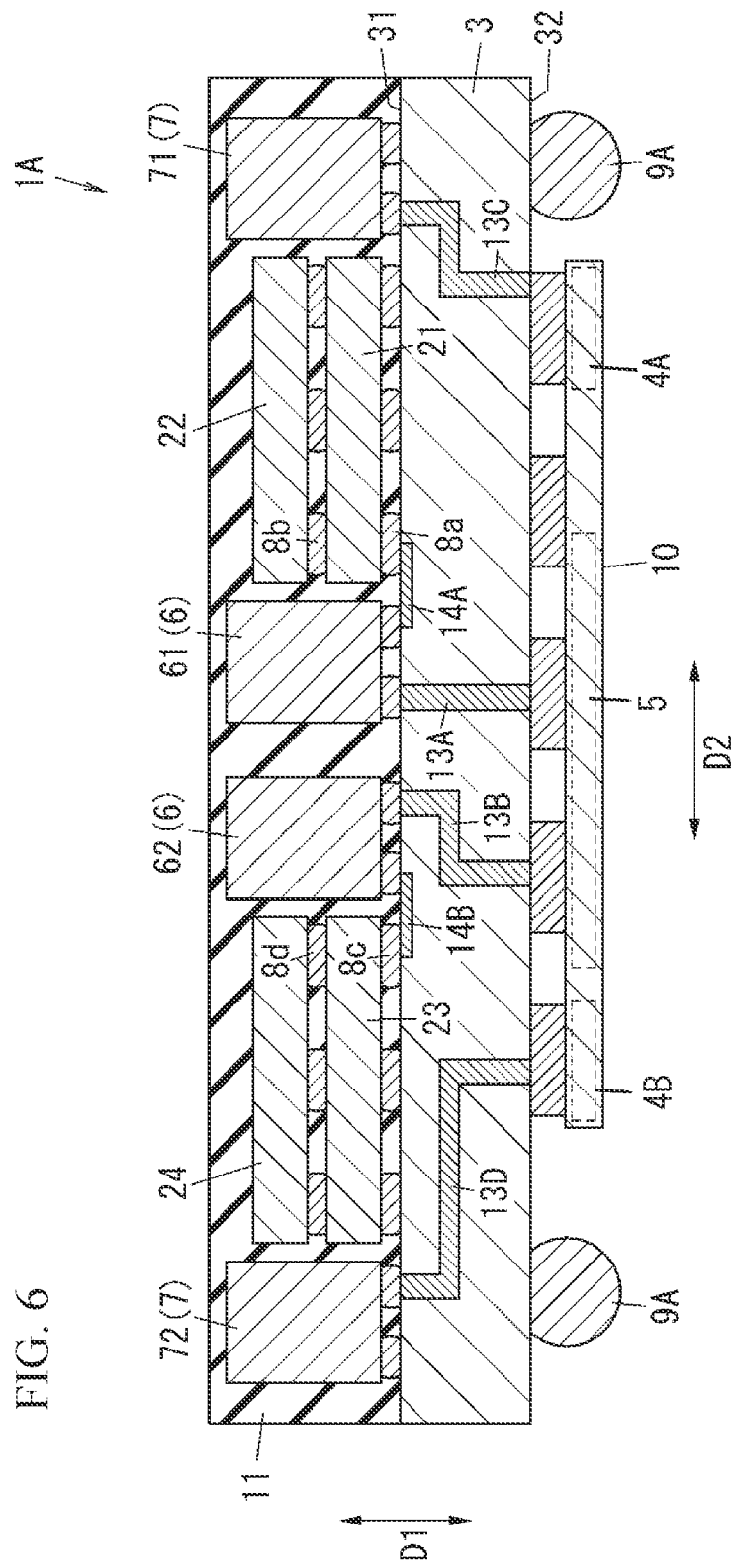
FIG. 6 is a cross-sectional view schematically illustrating a radio-frequency module according to a second modification of the first embodiment.

In contrast, as in the radio-frequency module 1A illustrated in FIG. 6, the second resin layer may be omitted at the second main surface 32 side of the mounting substrate 3, and the radio-frequency module 1A may be connected to the mother board with the multiple external connection electrodes 9A each formed into a spherical shape.

Each of the multiple external connection electrodes 9A is, for example, a ball bump formed into a spherical shape. The material of the ball bump is, for example, gold, copper, solder, or the like.

(5.3) Third Modification

Figure 7:
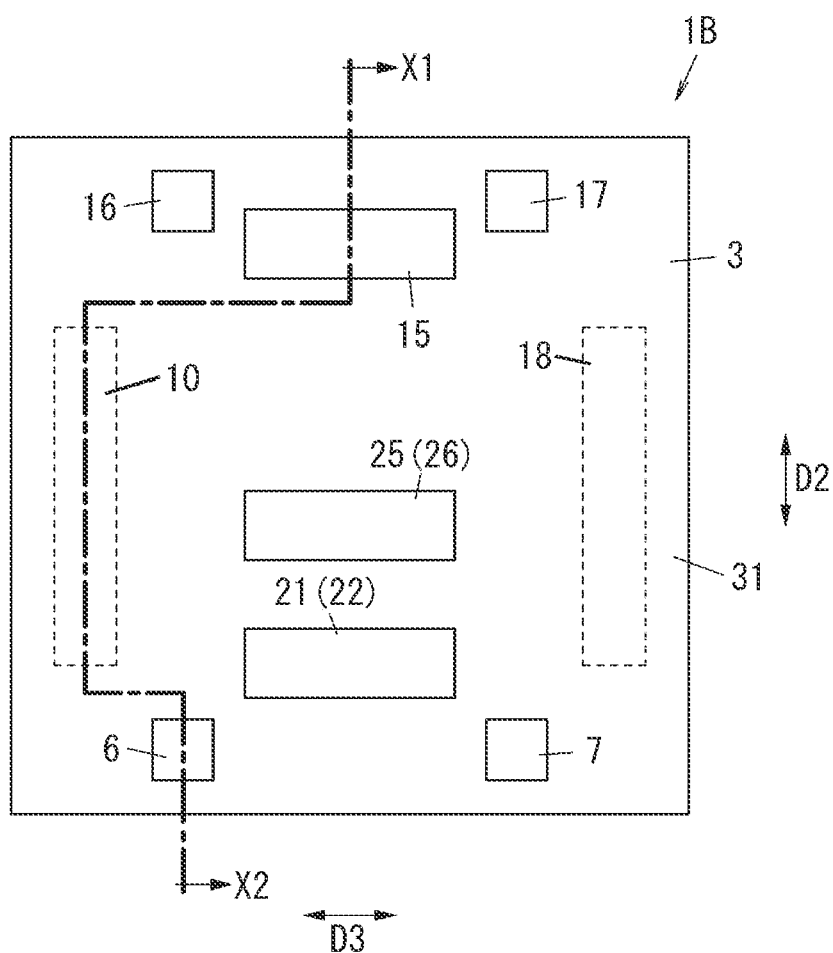
FIG. 7 is a schematic plan view of a radio-frequency module according to a third modification of the first embodiment.
Figure 8A:
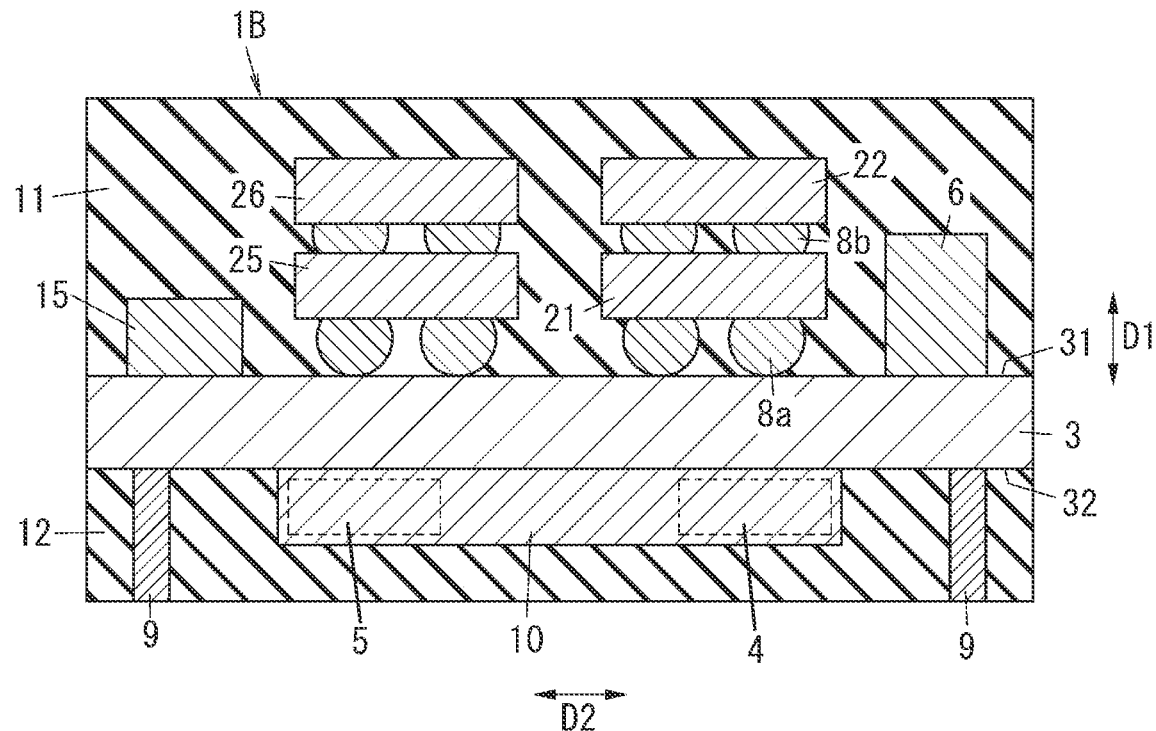
FIG. 8A is a cross-sectional view taken along the line X1-X2 in FIG. 7.

Although the radio-frequency module 1 in a reception system, which receives the reception signal from the antenna 201 and supplies the reception signal to the RF signal processing circuit 203, is exemplified in the first embodiment, a radio-frequency module 1B resulting from the combination of the reception system and a transmission system may be adopted, as illustrated in FIG. 7 and FIG. 8A. The radio-frequency module 1B according to a third modification will now be described with reference to FIG. 7 and FIG. 8A.

The radio-frequency module 1B according to the third modification includes the first filter 21, the second filter 22, a fifth filter 25, a sixth filter 26, the switch IC 10, and a switch IC 18, as illustrated in FIG. 7. In addition, the radio-frequency module 1B includes the first matching circuit 6, the second matching circuit 7, a third matching circuit 16, a fourth matching circuit 17, and a power amplifier 15. The switch IC 10 includes a low noise amplifier 4 and the antenna switch 5. Since the third matching circuit 16 corresponds to the first matching circuit 6 and the fourth matching circuit 17 corresponds to the second matching circuit 7, a description of the third matching circuit 16 and the fourth matching circuit 17 is omitted herein. In addition, since the switch IC 18 has the same configuration as that of the switch IC 10, a description of the switch IC 18 is also omitted herein.

Each of the first filter 21 and the second filter 22 is, for example, a reception filter that transmits the reception signal received through the antenna 201 (refer to FIG. 2). The first filter 21 and the second filter 22 are provided on the first main surface 31 of the mounting substrate 3 in the state in which the first filter 21 and the second filter 22 are sequentially laminated from the first main surface 31 side in the first direction D1, which is the thickness direction of the mounting substrate 3, as illustrated in FIG. 8A. In other words, the first filter 21 is overlapped with the second filter 22 in a plan view from the first direction D1.

Each of the fifth filter 25 and the sixth filter 26 is, for example, a transmission filter that transmits the transmission signal to be transmitted through the antenna 201. The fifth filter 25 and the sixth filter 26 are provided on the first main surface 31 of the mounting substrate 3 in a state in which the fifth filter 25 and the sixth filter 26 are sequentially laminated from the first main surface 31 side in the first direction D1, which is the thickness direction of the mounting substrate 3, as illustrated in FIG. 8A. In other words, the fifth filter 25 is overlapped with the sixth filter 26 in a plan view from the first direction D1.

The first matching circuit 6 is mounted on the first main surface 31 of the mounting substrate 3, as illustrated in FIG. 8A. The first matching circuit 6 is adjacent to the first filter 21 and the second filter 22 in the second direction D2, which is the direction orthogonal to the first direction D1, which is the thickness direction of the mounting substrate 3.

The power amplifier 15 is mounted on the first main surface 31 of the mounting substrate 3, as illustrated in FIG. 8A. The power amplifier 15 is adjacent to the fifth filter 25 and the sixth filter 26 in the second direction D2, which is the direction orthogonal to the first direction D1, which is the thickness direction of the mounting substrate 3.

The switch IC 10 is mounted on the second main surface 32 of the mounting substrate 3, as illustrated in FIG. 8A. The switch IC 10 is overlapped with the first filter 21, the second filter 22, the fifth filter 25, and the sixth filter 26 in the first direction D1, which is the thickness direction of the mounting substrate 3.

The input terminal of each of the first filter 21 and the second filter 22 is connected to the antenna switch 5 via the first matching circuit 6. The output terminal of each of the first filter 21 and the second filter 22 is connected to the low noise amplifier 4 via the second matching circuit 7.

The input terminal of each of the fifth filter 25 and the sixth filter 26 is connected to the power amplifier 15 via the fourth matching circuit 17. The output terminal of each of the fifth filter 25 and the sixth filter 26 is connected to the antenna switch 5 via the third matching circuit 16.

In the radio-frequency module 1B according to the third modification, the first filter 21 and the second filter 22 are laminated in the first direction D1, which is the thickness direction of the mounting substrate 3.

Accordingly, the size of the mounting substrate 3 is reduced, compared with the case in which the first filter 21 and the second filter 22 are separately mounted on the mounting substrate 3. As a result, it is also possible to reduce the size of the radio-frequency module 1B including the mounting substrate 3.

In addition, in the radio-frequency module 1B according to the third modification, the first input terminal 211 of the first filter 21 is connected to the mounting substrate 3, and the second input terminal 221 of the second filter 22 is connected to the mounting substrate 3 via the first input terminal (the common terminal) 211. In addition, in the radio-frequency module 1B, the second filter 22 is laminated on the first filter 21. Accordingly, the ground terminal area on the mounting face of the first filter 21 at the lower side is increased in size, compared with a case in which the first input terminal 211 of the first filter 21 is not integrated with the second input terminal 221 of the second filter 22, but is provided separately from the second input terminal 221 of the second filter 22. As a result, the degradation in the filter characteristics of the first filter 21 is suppressed. In addition, since the second filter 22 is laminated on the first filter 21, the size of the mounting substrate 3 is reduced, compared with the case in which the first filter 21 and the second filter 22 are separately mounted on the mounting substrate 3. In other words, with the radio-frequency module 1B, it is possible to suppress the degradation in the filter characteristics of the first filter 21 while reducing the size of the radio-frequency module 1B.

(5.4) Fourth Modification

In the third modification, the low noise amplifier 4 and the antenna switch 5 are formed into one chip to compose the switch IC 10 in the radio-frequency module 1B, as illustrated in FIG. 8A. In contrast, as in a radio-frequency module 1C illustrated in FIG. 8B, the low noise amplifier 4 and the antenna switch 5 may be separately provided. The remaining configuration is the same as that of the radio-frequency module 1B according to the third modification and a description of the remaining configuration is omitted herein.

Figure 8B:
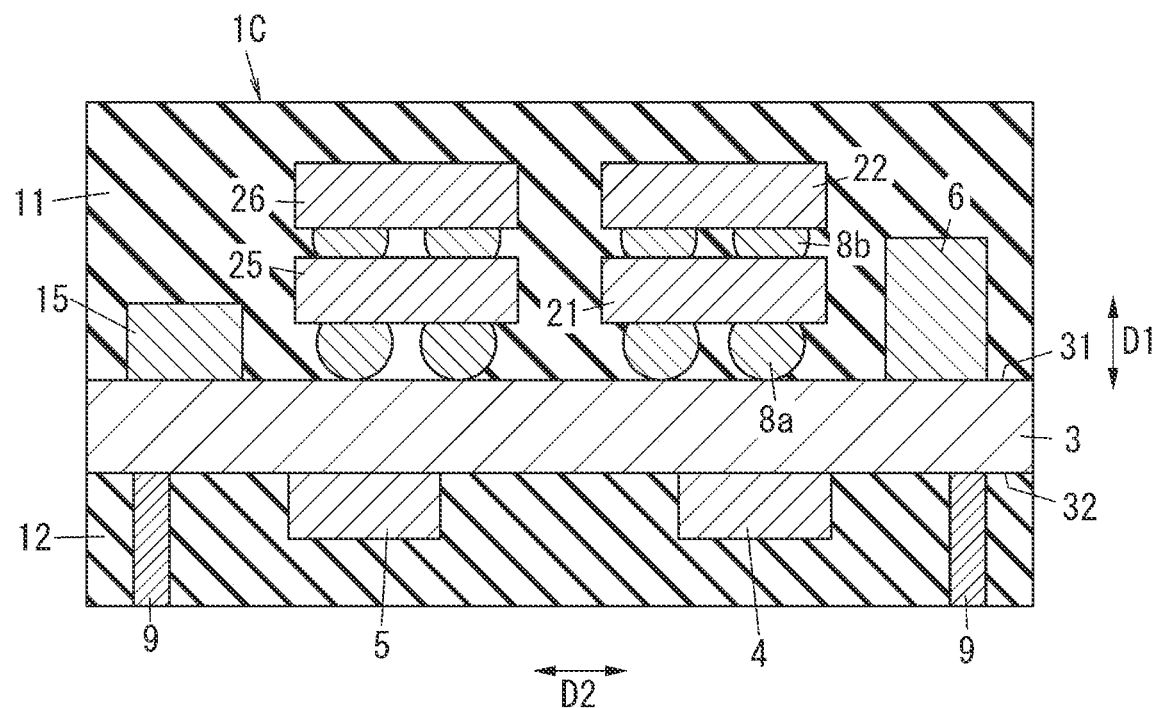
FIG. 8B is a cross-sectional view of a radio-frequency module according to a fourth modification of the first embodiment.

In the radio-frequency module 1C according to a fourth modification, the first filter 21 and the second filter 22 are laminated in the first direction D1, which is the thickness direction of the mounting substrate 3, as illustrated in FIG. 8B. Accordingly, the size of the mounting substrate 3 is reduced, compared with the case in which the first filter 21 and the second filter 22 are separately mounted on the mounting substrate 3. As a result, it is possible to reduce the size of the radio-frequency module 1C including the mounting substrate 3.

In addition, in the radio-frequency module 1C according to the fourth modification, the first input terminal 211 of the first filter 21 is connected to the mounting substrate 3, and the second input terminal 221 of the second filter 22 is connected to the mounting substrate 3 via the first input terminal (the common terminal) 211, as illustrated in FIG. 8B. In addition, in the radio-frequency module 1C, the second filter 22 is laminated on the first filter 21. Accordingly, the ground terminal area on the mounting face of the first filter 21 at the lower side is increased in size, compared with the case in which the first input terminal 211 of the first filter 21 is not integrated with the second input terminal 221 of the second filter 22, but is provided separately from the second input terminal 221 of the second filter 22. As a result, the degradation in the filter characteristics of the first filter 21 is suppressed. In addition, since the second filter 22 is laminated on the first filter 21, the size of the mounting substrate 3 is reduced, compared with the case in which the first filter 21 and the second filter 22 are separately mounted on the mounting substrate 3. In other words, with the radio-frequency module 1C, it is possible to suppress the degradation in the filter characteristics of the first filter 21 while reducing the size of the radio-frequency module 1C.

(5.5) Other Modifications

Other modifications of the first embodiment will now be described.

Although the switch IC 10 is overlapped with the entire first filter 21 and the entire second filter 22 in a plan view from the first direction D1 in the first embodiment, the switch IC 10 may be overlapped with part of the first filter 21 and the second filter 22 in a plan view from the first direction D1. In other words, it is sufficient for the switch IC 10 to be overlapped with at least part of the first filter 21 and the second filter 22 in a plan view from the first direction D1.

In addition, although the switch IC 10 is overlapped with the entire first matching circuit 6 in a plan view from the first direction D1 in the first embodiment, the switch IC 10 may be overlapped with part of the first matching circuit 6 in a plan view from the first direction D1. In other words, it is sufficient for the switch IC 10 to be overlapped with at least part of the first matching circuit 6 in a plan view from the first direction D1.

Furthermore, although the antenna switch 5 included in the switch IC 10 is overlapped with the entire first matching circuit 6 in a plan view from the first direction D1 in the first embodiment, the antenna switch 5 may be overlapped with part of the first matching circuit 6 in a plan view from the first direction D1. In other words, it is sufficient for the antenna switch 5 to be overlapped with at least part of the first matching circuit 6 in a plan view from the first direction D1.

Although each acoustic wave resonator composing the first filter 21 to the fourth filter 24 is the SAW resonator in the first embodiment, the acoustic wave resonator is not limited to the SAW resonator. The acoustic wave resonator may be, for example, a first acoustic wave resonator. The first acoustic wave resonator includes a substrate having a front face and a rear face, a low-acoustic-velocity film provided on the front face of the substrate, a piezoelectric layer provided on the low-acoustic-velocity film, and IDT electrodes provided on the piezoelectric layer. The low-acoustic-velocity film is directly or indirectly provided on the substrate. The piezoelectric layer is directly or indirectly provided on the low-acoustic-velocity film. In the low-acoustic-velocity film, the acoustic velocity of the bulk waves that are propagated in the piezoelectric layer is lower than the acoustic velocity of the acoustic waves that are propagated in the piezoelectric layer. In the substrate, the acoustic velocity of the bulk waves that are propagated in the piezoelectric layer is higher than the acoustic velocity of the acoustic waves that are propagated in the piezoelectric layer. The material of the piezoelectric layer is, for example, lithium tantalate. The material of the low-acoustic-velocity film is, for example, silicon oxide. The substrate is, for example, a silicon substrate. The thickness of the piezoelectric layer is, for example, 3.5λ or less where the wavelength of the acoustic waves, which is determined based on the period of electrode fingers of the IDT electrodes, is denoted by λ. The thickness of the low-acoustic-velocity film is, for example, 2.0λ or less.

Part of the acoustic wave resonators composing the first filter 21 to the fourth filter 24 may be the SAW resonators, and the remaining acoustic wave resonators may be the first acoustic wave resonators. In other words, the first filter 21 to the fourth filter 24 may be made of different materials. For example, in the first filter 21 using the Band1 communication band, the acoustic wave resonator is preferably the SAW resonator. In the second filter 22 using the Band3 communication band, the acoustic wave resonator is preferably the first acoustic wave resonator. Selecting an appropriate acoustic wave resonator for each frequency band that is used enables the degradation in the filter characteristics of each filter to suppressed. In addition, the acoustic wave resonators may be, for example, the BAW resonators.

Although the communication band of the first filter 21 is Band1, the communication band of the second filter 22 is Band3, and the communication band of the third filter 23 is Band40 in the first embodiment, the communication bands of the first filter 21, the second filter 22, and the third filter 23 are not limited to the above ones. For example, when the communication band of the first filter 21 is Band1 and the communication band of the second filter 22 is Band3, the communication band of the third filter 23 may be, for example, Band7 or Band41. The communication band of the first filter 21 may be Band25, and the communication band of the second filter 22 may be Band66. In this case, the communication band of the third filter 23 may be, for example, Band30, Band7, or Band41. In addition, the communication band of the first filter 21 may be Band34, and the communication band of the second filter 22 may be Band39. In this case, the communication band of the third filter 23 may be, for example, Band7 or Band41.

Second Embodiment

Figure 9:
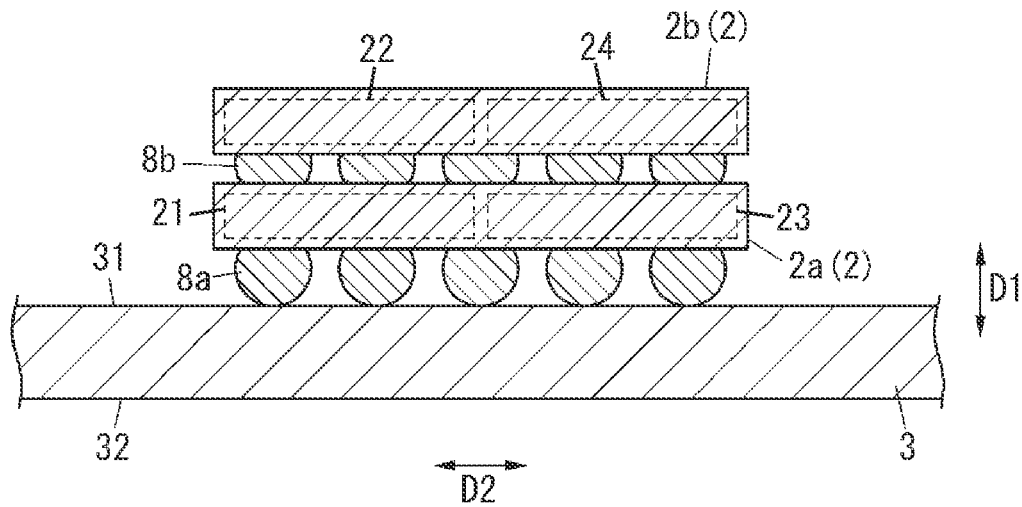
FIG. 9 is a schematic cross-sectional view of filter units in a radio-frequency module according to a second embodiment.

Although the first filter 21 and the second filter 22, which are each composed of one filter, are laminated in the first embodiment, filter units 2 each including multiple filters may be laminated, as illustrated in FIG. 9. A radio-frequency module according to a second embodiment will now be described with reference to FIG. 9 and FIG. 10.

(1) Configuration of Radio-Frequency Module

The radio-frequency module according to the second embodiment includes the mounting substrate 3 and the multiple filter units 2, as illustrated in FIG. 9. In addition, the radio-frequency module according to the second embodiment includes the switch IC, the first matching circuit, and the second matching circuit. The switch IC, the first matching circuit, and the second matching circuit in the second embodiment are the same as those in the first embodiment and a description of the switch IC, the first matching circuit, and the second matching circuit in the second embodiment is omitted herein. When the multiple filter units 2 are distinguished from each other in the following description, the respective multiple filter units 2 are also referred to as a "first filter unit 2*a*" and a "second filter unit 2*b*".

(1.1) Mounting Substrate

The mounting substrate 3 has the first main surface 31 and the second main surface 32, as illustrated in FIG. 9. The first main surface 31 is opposed to the second main surface 32 in the first direction D1, which is the thickness direction of the mounting substrate 3. Electronic components including the multiple filter units 2, which compose the radio-frequency module, are mounted on the first main surface 31 and the second main surface 32. In the present embodiment, the multiple filter units 2 are mounted on the first main surface 31.

(1.2) First Filter Unit

The first filter unit 2*a* includes the first filter 21 and the third filter 23, as illustrated in FIG. 9. In other words, in the first filter unit 2*a*, the first filter 21 and the third filter 23 are integrated into one chip. In the first filter unit 2*a*, the first filter 21 and the third filter 23 are arranged in the second direction D2, which is the direction orthogonal to the first direction D1, which is the thickness direction of the mounting substrate 3. The first filter unit 2*a* is connected to the mounting substrate 3 via the multiple external connection terminals 8*a*. Although each of the multiple external connection terminals 8*a* is, for example, a solder bump, each of the multiple external connection terminals 8*a* may be a gold bump. The first filter 21 and the third filter 23 are the same as the first filter 21 and the third filter 23 according to the first embodiment and a description of the first filter 21 and the third filter 23 in the second embodiment is omitted herein.

(1.3) Second Filter Unit

The second filter unit 2*b* includes the second filter 22 and the fourth filter 24, as illustrated in FIG. 9. In other words, in the second filter unit 2*b*, the second filter 22 and the fourth filter 24 are integrated into one chip. In the second filter unit 2*b*, the second filter 22 and the fourth filter 24 are arranged in the second direction D2. The second filter unit 2*b* is connected to the first filter unit 2*a* via the multiple external connection terminals 8*b* and is connected to the mounting substrate 3 via the first filter unit 2*a*. Although each of the multiple external connection terminals 8*b* is, for example, a solder bump, each of the multiple external connection terminals 8*b* may be a gold bump. The second filter 22 and the fourth filter 24 are the same as the second filter 22 and the fourth filter 24 according to the first embodiment and a description of the second filter 22 and the fourth filter 24 in the second embodiment is omitted herein.

In the radio-frequency module according to the second embodiment, the first filter 21 in the first filter unit 2*a* and the second filter 22 in the second filter unit 2*b* are sequentially laminated (arranged) from the first main surface 31 side in the first direction D1, which is the thickness direction of the mounting substrate 3. In other words, the first filter 21 is overlapped with the second filter 22 in a plan view from the first direction D1.

In addition, in the radio-frequency module according to the second embodiment, the third filter 23 in the first filter unit 2*a* and the fourth filter 24 in the second filter unit 2*b* are sequentially laminated (arranged) from the first main surface 31 side in the first direction D1. In other words, the third filter 23 is overlapped with the fourth filter 24 in a plan view from the first direction D1.

(2) Terminal Arrangement in Each Filter Unit

Terminal arrangement in the first filter unit 2*a* and the second filter unit 2*b* will now be described with reference to FIG. 10.

The first input terminal 211, the first output terminal 212, and the multiple ground terminals 213 are electrically connected to the first filter 21 in the first filter unit 2*a*. Each of the first input terminal 211, the first output terminal 212, and the multiple ground terminals 213 is, for example, the external connection terminal (first external connection terminal) 8*a*. The second input terminal 221, the second output terminal 222, and the multiple ground terminals 223 are electrically connected to the second filter 22 in the second filter unit 2*b*. Each of the second input terminal 221, the second output terminal 222, and the multiple ground terminals 223 is, for example, the external connection terminal 8*b*. A third input terminal 231, a third output terminal 232, and multiple ground terminals 233 are electrically connected to the third filter 23 in the first filter unit 2*a*. Each of the third input terminal 231, the third output terminal 232, and the multiple ground terminals 233 is, for example, the external connection terminal 8*a*. A fourth input terminal 241, a fourth output terminal 242, and multiple ground terminals 243 are electrically connected to the fourth filter 24 in the second filter unit 2*b*. Each of the fourth input terminal 241, the fourth output terminal 242, and the multiple ground terminals 243 is, for example, the external connection terminal 8*b*.

The first input terminal 211 is connected to the first main surface 31 of the mounting substrate 3. The second input terminal 221 is electrically connected to the external connection terminal 8*a* composing the first input terminal 211, among the multiple external connection terminals 8*a*, and is connected to the first main surface 31 of the mounting substrate 3 via the external connection terminal 8*a*. In other words, in the radio-frequency module according to the second embodiment, the first input terminal 211 is connected to the mounting substrate 3, and the second input terminal 221 is connected to the mounting substrate 3 via the first input terminal 211. In the radio-frequency module according to the second embodiment, the first input terminal 211 is the common terminal.

The third input terminal 231 is connected to the first main surface 31 of the mounting substrate 3. The fourth input terminal 241 is electrically connected to the external connection terminal 8*a* composing the third input terminal 231, among the multiple external connection terminals 8*a*, and is connected to the first main surface 31 of the mounting substrate 3 via the external connection terminal 8*a*. In other words, in the radio-frequency module according to the second embodiment, the third input terminal 231 is connected to the mounting substrate 3, and the fourth input terminal 241 is connected to the mounting substrate 3 via the third input terminal 231.

The first output terminal 212 is connected to the first main surface 31 of the mounting substrate 3. The second output terminal 222 is connected to the first main surface 31 of the mounting substrate 3 via the corresponding external connection terminal 8*a*, among the multiple external connection terminals 8*a*.

The third output terminal 232 is connected to the first main surface 31 of the mounting substrate 3. The fourth output terminal 242 is connected to the first main surface 31 of the mounting substrate 3 via the corresponding external connection terminal 8*a*, among the multiple external connection terminals 8*a*.

Each ground terminal 213 and each ground terminal 233 are connected to the first main surface 31 of the mounting substrate 3. Each ground terminal 223 and each ground terminal 243 are connected to the first main surface 31 of the mounting substrate 3 via the corresponding external connection terminals 8a, among the multiple external connection terminals 8a.

In the radio-frequency module according to the second embodiment, the first filter unit 2a and the second filter unit 2b are laminated in the thickness direction D1 of the mounting substrate 3. Accordingly, the size of the mounting substrate 3 is reduced, compared with a case in which the first filter unit 2a and the second filter unit 2b are separately mounted on the mounting substrate 3. As a result, it is also possible to reduce the size of the radio-frequency module including the mounting substrate 3.

In addition, in the radio-frequency module according to the second embodiment, the first input terminal 211 of the first filter 21 is connected to the mounting substrate 3, and the second input terminal 221 of the second filter 22 is connected to the mounting substrate 3 via the first input terminal 211. In the radio-frequency module according to the second embodiment, the second filter 22 is laminated on the first filter 21. Accordingly, the ground terminal area on the mounting face of the first filter 21 at the lower side is increased in size, compared with the case in which the first input terminal 211 of the first filter 21 is not integrated with the second input terminal 221 of the second filter 22, but is provided separately from the second input terminal 221 of the second filter 22. As a result, the degradation in the filter characteristics of the first filter 21 is suppressed. In addition, since the second filter 22 is laminated on the first filter 21, the size of the mounting substrate 3 is reduced, compared with the case in which the first filter 21 and the second filter 22 are separately mounted on the mounting substrate 3. In other words, with the radio-frequency module, it is possible to suppress the degradation in the filter characteristics of the first filter 21 while reducing the size of the radio-frequency module.

Furthermore, in the radio-frequency module according to the second embodiment, the third input terminal 231 of the third filter 23 is connected to the mounting substrate 3, and the fourth input terminal 241 of the fourth filter 24 is connected to the mounting substrate 3 via the third input terminal 231. In the radio-frequency module according to the second embodiment, the fourth filter 24 is laminated on the third filter 23. Accordingly, the ground terminal area on the mounting face of the third filter 23 at the lower side is increased in size, compared with a case in which the third input terminal 231 of the third filter 23 is not integrated with the fourth input terminal 241 of the fourth filter 24, but is provided separately from the fourth input terminal 241 of the fourth filter 24. As a result, the degradation in the filter characteristics of the third filter 23 is suppressed. In addition, since the fourth filter 24 is laminated on the third filter 23, the size of the mounting substrate 3 is reduced, compared with a case in which the third filter 23 and the fourth filter 24 are separately mounted on the mounting substrate 3. In other words, with the radio-frequency module, it is possible to suppress the degradation in the filter characteristics of the third filter 23 while reducing the size of the radio-frequency module.

Figure 10:
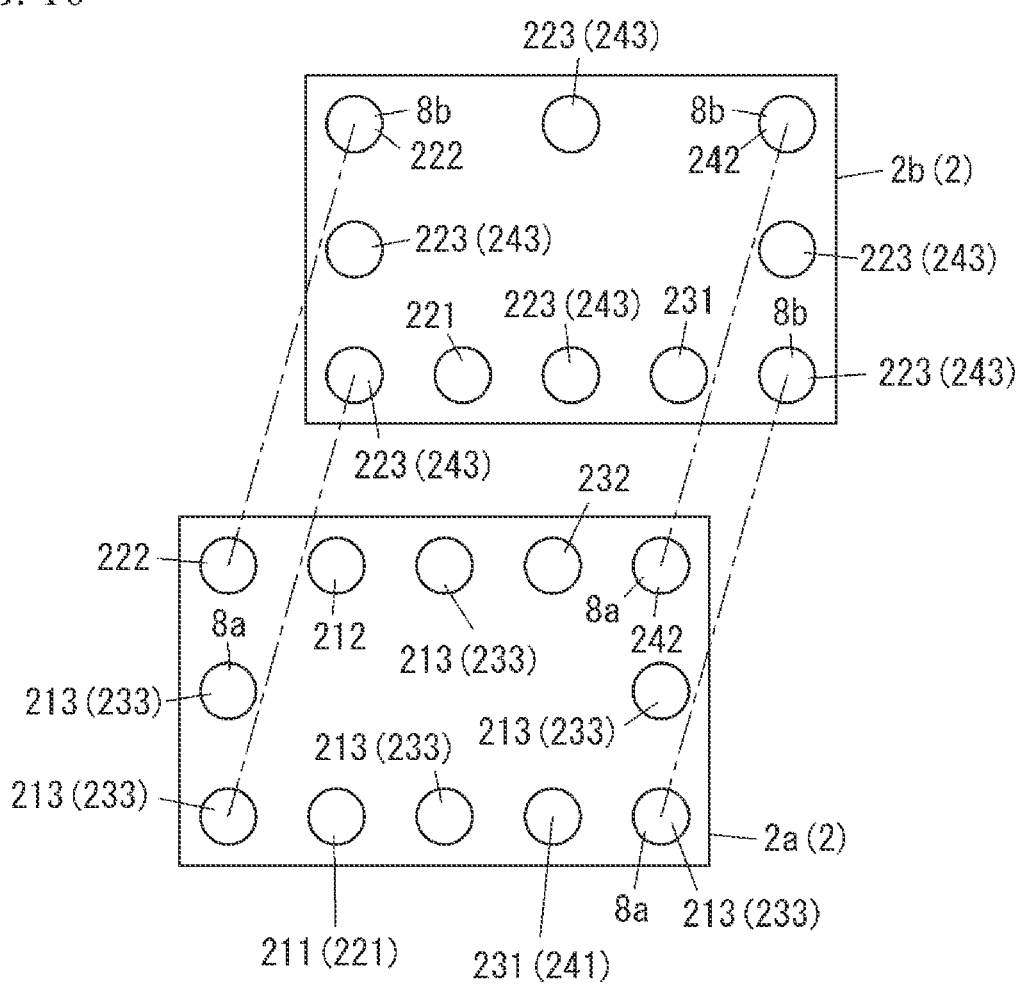
FIG. 10 is a schematic plan view of the filter units in the radio-frequency module in FIG. 9.

Here, the first input terminal 211, which is the common terminal, is preferably adjacent to the multiple ground terminals 213 in a plan view from the first direction D1, which is the thickness direction of the mounting substrate 3, as illustrated in FIG. 10. This suppresses the degradation in the isolation between the common terminal and another terminal (for example, the first output terminal 212). The same applies to the third filter 23 and the fourth filter 24.

(3) Modifications

Modifications of the radio-frequency module according to the second embodiment will now be described.

(3.1) First Modification

In the radio-frequency module according to the second embodiment, the second output terminal 222 is connected to the first main surface 31 of the mounting substrate 3 via the corresponding external connection terminal 8a, among the multiple external connection terminals 8a, as illustrated in FIG. 11A. In the radio-frequency module according to the second embodiment, the fourth output terminal 242 is connected to the first main surface 31 of the mounting substrate 3 via the corresponding external connection terminal 8a, among the multiple external connection terminals 8a, as illustrated in FIG. 11A.

In contrast, the second filter 22 may have a second input end (input end) 22A and a second output end (output end) 22B, and the second output end 22B may be connected to the first main surface 31 of the mounting substrate 3 with a bonding wire 303, as illustrated in FIG. 11B. The second signal is inputted into the second input end 22A. The second output end 22B outputs the second signal. The fourth filter 24 may have a fourth input end 24A and a fourth output end 24B, and the fourth output end 24B may be connected to the first main surface 31 of the mounting substrate 3 with a bonding wire 304. The fourth signal is inputted into the fourth input end 24A. The fourth output end 24B outputs the fourth signal.

In a radio-frequency module according to a first modification, a first output end 21B of the first filter 21, which is electrically connected to the first output terminal 212, and the second output end 22B of the second filter 22 are arranged with a certain spacing in a state in which the first output end 21B of the first filter 21 is electrically insulated from the second output end 22B of the second filter 22 in the first direction D1, which is the thickness direction of the mounting substrate 3, as illustrated in FIG. 11B. In addition, in the radio-frequency module according to the first modification, a third output end 23B of the third filter 23, which is electrically connected to the third output terminal 232, and the fourth output end 24B of the fourth filter 24 are arranged with a certain spacing in a state in which the third output end 23B of the third filter 23 is electrically insulated from the fourth output end 24B of the fourth filter 24 in the first direction D1.

In the above configuration, the isolation between the first output end 21B and the second output end 22B is ensured, compared with a case in which the first output terminal 212 and the second output terminal 222 are arranged with a certain spacing in the second direction D2, which is the direction orthogonal to the first direction D1 (refer to FIG. 11A). This improves the attenuation in each of the first filter 21 and the second filter 22. The same applies to the third output terminal 232 and the fourth output terminal 242.

(3.2) Second Modification

For example, a case is assumed in which the first filter unit 2a and the second filter unit 2b are laminated in the thickness direction D1 of the mounting substrate 3. In this case, since it is not necessary to connect the first output terminal 212 and the third output terminal 232 to the second filter unit 2b side as for the first filter 21 and the third filter 23, which are arranged on the first main surface 31 side of the mounting substrate 3, the external connection terminals may be omitted (refer to FIG. 12A).

However, when the above external connection terminals are omitted, the bonding strength and the bonding balance of the second filter unit 2*b* with respect to the first filter unit 2*a* may be reduced. Accordingly, a support 8*e* is preferably provided, instead of the external connection terminals described above, as illustrated in FIG. 12B. Although the support 8*e* is, for example, a solder bump, the support 8*e* may be a gold bump. The support 8*e* may be electrically connected to the second filter 22 or may not be electrically connected to the second filter 22. In a second modification, the support 8*e* is not electrically connected to the second filter 22 and the fourth filter 24. Accordingly, the support 8*e* may be made of, for example, resin or the like. Providing the support 8*e* in the above manner enables the degradation in the bonding strength and the bonding balance of the second filter unit 2*b* with respect to the first filter unit 2*a* to be suppressed.

The support 8*e* may be connected to either of the multiple ground terminals 223 and 243. This increases the ground area in the first filter unit 2*a* and the second filter unit 2*b*.

(Review)

The following aspects are disclosed from the embodiments and so on described above.

A radio-frequency module (1; 1A; 1B; 1C) according to a first aspect includes a common terminal (for example, a first input terminal 211), a first filter (21), a second filter (22), a mounting substrate (3), and an external connection terminal (8*a*). The first filter (21) is connected to the common terminal and transmits a first signal in a first frequency band. The second filter (22) is connected to the common terminal and transmits a second signal in a second frequency band different from the first frequency band. The mounting substrate (3) has the first filter (21) mounted thereon. The first filter (21) is connected to the mounting substrate (3) with the external connection terminal (8*a*). The second filter (22) is laminated on the first filter (21). The external connection terminal (8*a*) is the common terminal.

With the above aspect, it is possible to suppress the degradation in the filter characteristics in the first filter (21) and the second filter (22).

The radio-frequency module (1) according to a second aspect further includes a switch IC (10) in the first aspect. The switch IC (10) includes an antenna switch (5) connected to the first filter (21) and the second filter (22). The mounting substrate (3) has a first main surface (31) and a second main surface (32) that are opposed to each other in a thickness direction (D1) of the mounting substrate (3). The first filter (21) is provided on the first main surface (31). The switch IC (10) is provided on the second main surface (32). The switch IC (10) is overlapped with at least part of the first filter (21) and the second filter (22) in a plan view from the thickness direction (D1).

With the above aspect, it is possible to shorten the path (wiring length) between the first filter (21) and the second filter (22) and the switch IC (10).

The radio-frequency module (1; 1A; 1B; 1C) according to a third aspect further includes a matching circuit (6) in the second aspect. The matching circuit (6) is connected between the first filter (21) and the second filter (22) and the antenna switch (5). The matching circuit (6) is provided on the first main surface (31) in a state in which the matching circuit (6) is adjacent to the first filter (21) and the second filter (22).

With the above aspect, it is possible to shorten the path (wiring length) between the first filter (21) and the second filter (22) and the matching circuit (6).

The radio-frequency module (1; 1A; 1B; 1C) according to a fourth aspect further includes a second external connection terminal (8*c*) and a third filter (23) in the second or third aspect. The second external connection terminal (8*c*) is different from a first external connection terminal (8*a*) serving as the external connection terminal. The third filter (23) is electrically connected to the second external connection terminal (8*c*) and transmits a third signal in a third frequency band different from the first frequency band and the second frequency band. The third filter (23) is connected to the mounting substrate (3) via the second external connection terminal (8*c*). The common terminal and the second external connection terminal (8*c*) are bound via the antenna switch (5) in the radio-frequency module (1; 1A; 1B). The first signal, the second signal, and the third signal are simultaneously transmitted or received through carrier aggregation or dual connectivity in the radio-frequency module (1; 1A; 1B; 1C).

With the above aspect, it is possible to improve the filter characteristics of the third filter (23).

In the radio-frequency module (1) according to a fifth aspect, the switch IC (10) is overlapped with at least part of the matching circuit (6) in a plan view from the thickness direction (D1) in the third or fourth aspect.

With the above aspect, it is possible to shorten the path (wiring length) between the switch IC (10) and the matching circuit (6).

In the radio-frequency module (1) according to a sixth aspect, the antenna switch (5) is overlapped with at least part of the matching circuit (6) in a plan view from the thickness direction (D1) in the fifth aspect.

With the above aspect, it is possible to shorten the path (wiring length) between the antenna switch (5) and the matching circuit (6).

The radio-frequency module (1; 1A; 1B; 1C) according to a seventh aspect further includes multiple ground terminals (213, 223) in any of the first to sixth aspects. The multiple ground terminals (213, 223) are connected to ground provided on the mounting substrate (3). The common terminal is adjacent to the multiple ground terminals (213, 223) in a plan view from the thickness direction (D1).

With the above aspect, it is possible to suppresses the degradation in the isolation between the first signal terminal and the second signal terminal and another terminal (for example, the second output terminal 222).

The radio-frequency module (1) according to an eighth aspect further includes an input terminal (221), an output terminal (222), and a support (8*e*) in the seventh aspect. The input terminal (221) is electrically connected to the second filter (22). The output terminal (222) is electrically connected to the second filter (22). The support (8*e*) is arranged between the first filter (21) and the second filter (22) in the thickness direction (D1). The support (8*e*) is not electrically connected to at least the input terminal (221) and the output terminal (222).

With the above aspect, it is possible to improve the bonding strength and the bonding balance of the second filter (22) with respect to the first filter (21).

In the radio-frequency module (1) according to a ninth aspect, the support (8*e*) is connected to any of the multiple ground terminals (213, 223) in the eighth aspect.

With the above aspect, it is possible to increase the ground area in each of the first filter (21) and the second filter (22).

In the radio-frequency module (1) according to a tenth aspect, the second filter (21) has an input end (22A) into which the second signal is inputted and an output end (22B) from which the second signal is outputted in the seventh aspect. The output end (22B) is connected to the mounting substrate (3) with a bonding wire (303).

With the above aspect, it is possible to suppress the degradation in the isolation between the first output terminal (212) of the first filter (21) and the second output terminal (222) of the second filter (22).

In the radio-frequency module (1) according to an eleventh aspect, the first filter (21) and the second filter (22) are made of different materials in any of the first to tenth aspects.

With the above aspect, it is possible to suppress the degradation in the filter characteristics in each of the first filter (21) and the second filter (22) by selecting an appropriate material for each frequency band used in each of the first filter (21) and the second filter (22).

A communication apparatus (200) according to a twelfth aspect includes the radio-frequency module (1; LA; 1B; 1C) according to any of the first to eleventh aspects and a signal processing circuit (202). The signal processing circuit (202) processes the first signal and the second signal.

With the above aspect, it is possible to suppress the degradation in the filter characteristics in the first filter (21) and the second filter (22).

1, 1A, 1B, 1C radio-frequency module
3 mounting substrate
5 antenna switch
6 first matching circuit (matching circuit)
8a external connection terminal (first external connection terminal, common terminal)
8c external connection terminal (second external connection terminal)
8e support
10 switch IC
21 first filter
22 second filter
22A second input end (input end)
22B second output end (output end)
23 third filter
31 first main surface
32 second main surface
200 communication apparatus
202 signal processing circuit
211 first input terminal (common terminal)
213 ground terminal
221 second input terminal (input terminal)
222 second output terminal (output terminal)
223 ground terminal
303 bonding wire
D1 first direction (thickness direction)

The invention claimed is:

1. A radio-frequency module comprising:
a common terminal;
a first filter that is connected to the common terminal and that is configured to pass a first signal in a first frequency band;
a second filter that is connected to the common terminal and that is configured to pass a second signal in a second frequency band different than the first frequency band;
a mounting substrate, the first filter being mounted on the mounting substrate; and
a switch integrated circuit (IC) comprising an antenna switch connected to the first filter and to the second filter,
wherein the common terminal is an external connection terminal with which the first filter is connected to the mounting substrate,
wherein the second filter is directly laminated on the first filter,
wherein the mounting substrate has a first main surface and a second main surface that are opposite each other in a thickness direction of the mounting substrate,
wherein the first filter is on the first main surface,
wherein the switch IC is on the second main surface, and
wherein the switch IC overlaps at least part of the first filter and at least part of the second filter in a plan view of the radio-frequency module in the thickness direction.

2. The radio-frequency module according to claim 1, further comprising:
a matching circuit connected between the first filter, and the second filter and the antenna switch,
wherein the matching circuit is on the first main surface and is adjacent to the first filter and to the second filter.

3. The radio-frequency module according to claim 1, further comprising:
a second external connection terminal different than the external connection terminal; and
a third filter that is electrically connected to the second external connection terminal and that is configured to pass a third signal in a third frequency band, the third frequency band being different than the first frequency band and different than the second frequency band,
wherein the third filter is connected to the mounting substrate via the second external connection terminal,
wherein the common terminal and the second external connection terminal are bound via the antenna switch, and
wherein the first signal, the second signal, and the third signal are simultaneously transmitted or received through carrier aggregation or dual connectivity.

4. The radio-frequency module according to claim 2, wherein the switch IC overlaps at least part of the matching circuit in the plan view from the thickness direction.

5. The radio-frequency module according to claim 4, wherein the antenna switch overlaps at least part of the matching circuit in the plan view from the thickness direction.

6. The radio-frequency module according to claim 1, further comprising:
a plurality of ground terminals on the mounting substrate and electrically connected to ground,
wherein the common terminal is adjacent to the plurality of ground terminals in the plan view of the radio-frequency module in the thickness direction of the mounting substrate.

7. The radio-frequency module according to claim 6, further comprising:
an input terminal electrically connected to the second filter;
an output terminal electrically connected to the second filter; and
a support arranged between the first filter and the second filter in the thickness direction,
wherein the support is not electrically connected to at least the input terminal and the output terminal.

8. The radio-frequency module according to claim 7, wherein the support is electrically connected to any of the plurality of ground terminals.

9. The radio-frequency module according to claim 6, wherein the second signal is input to an input end of the second filter, and is output from an output end of the second filter, and wherein the output end of the second filter is connected to the mounting substrate with a bonding wire.

10. The radio-frequency module according to claim 1, wherein the first filter and the second filter are of different materials.

11. A communication apparatus comprising:
the radio-frequency module according to claim 1; and
a signal processing circuit configured to process the first signal and the second signal.

* * * * *